(12) United States Patent
Kozuma et al.

(10) Patent No.: US 9,916,793 B2
(45) Date of Patent: Mar. 13, 2018

(54) SEMICONDUCTOR DEVICE AND METHOD OF DRIVING THE SAME

(71) Applicant: SEMICONDUCTOR ENERGY LABORATORY CO., LTD., Atsugi-shi, Kanagawa-ken (JP)

(72) Inventors: Munehiro Kozuma, Kanagawa (JP);
Takayuki Ikeda, Kanagawa (JP);
Yoshiyuki Kurokawa, Kanagawa (JP);
Hikaru Tamura, Kanagawa (JP);
Takeshi Aoki, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 199 days.

(21) Appl. No.: 13/895,568

(22) Filed: May 16, 2013

(65) Prior Publication Data
US 2013/0321366 A1    Dec. 5, 2013

(30) Foreign Application Priority Data

Jun. 1, 2012    (JP) .................................. 2012-126387

(51) Int. Cl.
*G06F 3/042*    (2006.01)
*G09G 3/34*    (2006.01)
*G06F 3/041*    (2006.01)

(52) U.S. Cl.
CPC ............. *G09G 3/34* (2013.01); *G06F 3/0412* (2013.01); *G06F 3/0421* (2013.01)

(58) Field of Classification Search
CPC ...... G09G 3/34; G09G 3/3233; G06F 3/0412; G06F 3/0421; G06F 1/3203; G06F 3/042; G02F 1/13318; G01C 21/3664

(Continued)

(56) References Cited

U.S. PATENT DOCUMENTS

| 5,731,856 A | 3/1998 | Kim et al. |
| 5,744,864 A | 4/1998 | Cillessen et al. |

(Continued)

FOREIGN PATENT DOCUMENTS

| EP | 1 737 044 A1 | 12/2006 |
| EP | 2177973 A | 4/2010 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters) , Sep. 27, 2004, vol. 85, No. 13, pp. 2541-2543.

(Continued)

*Primary Examiner* — Richard Hong
(74) *Attorney, Agent, or Firm* — Nixon Peabody LLP; Jeffrey L. Costella

(57) ABSTRACT

To reduce the effect of external light and to improve the accuracy of detecting the location of a touch. In an image-capture period, light emission from a self-light-emitting element is controlled, and imaging data at the time of displaying white on a display screen and imaging data at the time of displaying black on the display screen are output from each sensor pixel. The location of a sensor pixel where a difference between the two pieces of imaging data output from the same sensor pixel is the greatest is detected. Thus, the location of a touch of the object on the display screen is detected with high accuracy. By utilizing a difference between imaging data at the time of reverse display, the effect of external light can be reduced.

14 Claims, 8 Drawing Sheets

(58) Field of Classification Search
USPC .................................................... 345/204
See application file for complete search history.

(56) References Cited

U.S. PATENT DOCUMENTS

| | | | |
|---|---|---|---|
| 6,294,274 | B1 | 9/2001 | Kawazoe et al. |
| 6,563,174 | B2 | 5/2003 | Kawasaki et al. |
| 6,727,522 | B1 | 4/2004 | Kawasaki et al. |
| 6,747,638 | B2 | 6/2004 | Yamazaki et al. |
| 7,046,240 | B2 * | 5/2006 | Kimura ............... G09G 3/2022 257/E21.413 |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,525,523 | B2 | 4/2009 | Yamazaki et al. |
| 7,612,320 | B2 | 11/2009 | Hagihara |
| 7,674,650 | B2 | 3/2010 | Akimoto et al. |
| 7,732,819 | B2 | 6/2010 | Akimoto et al. |
| 7,995,008 | B2 | 8/2011 | Miwa |
| 8,426,866 | B2 | 4/2013 | Kimura et al. |
| 8,497,820 | B2 * | 7/2013 | Goh ................... G09G 3/3233 315/169.3 |
| 8,890,187 | B2 * | 11/2014 | Arasawa ...................... 257/98 |
| 9,024,885 | B2 | 5/2015 | Ahn et al. |
| 9,542,022 | B2 | 1/2017 | Kozuma |
| 2001/0046027 | A1 | 11/2001 | Tai et al. |
| 2002/0011972 | A1 | 1/2002 | Yamazaki et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0007355 | A1 * | 1/2005 | Miura ................... G09G 3/3233 345/204 |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0256093 | A1 | 11/2006 | Furukawa et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0018075 | A1 | 1/2007 | Cazaux et al. |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0132710 | A1 * | 6/2007 | Tateuchi ............... G06F 1/3203 345/102 |
| 2007/0152217 | A1 | 7/2007 | Lai et al. |
| 2007/0172591 | A1 | 7/2007 | Seo et al. |
| 2007/0182700 | A1 * | 8/2007 | Baba et al. ................. 345/102 |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0054319 | A1 | 3/2008 | Mouli |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0180385 | A1 | 7/2008 | Yoshida et al. |
| 2008/0182358 | A1 | 7/2008 | Cowdery-Corvan et al. |
| 2008/0197269 | A1 | 8/2008 | Hagihara |
| 2008/0211787 | A1 | 9/2008 | Nakao et al. |
| 2008/0224133 | A1 | 9/2008 | Park et al. |
| 2008/0246708 | A1 * | 10/2008 | Ishiguro ............... G02F 1/13318 345/87 |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0291430 | A1 * | 11/2008 | Nozawa ............... G01C 21/3664 356/73 |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0101948 | A1 | 4/2009 | Park et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2009/0289968 | A1 | 11/2009 | Yoshida |
| 2009/0295769 | A1 * | 12/2009 | Yamazaki ......... H01L 27/14678 345/207 |
| 2010/0065844 | A1 | 3/2010 | Tokunaga |
| 2010/0092800 | A1 | 4/2010 | Itagaki et al. |
| 2010/0097352 | A1 | 4/2010 | Ahn et al. |
| 2010/0109002 | A1 | 5/2010 | Itagaki et al. |
| 2010/0182282 | A1 | 7/2010 | Kurokawa et al. |
| 2011/0109593 | A1 | 5/2011 | Kurokawa et al. |
| 2011/0109605 | A1 * | 5/2011 | Omori ................... G06F 3/042 345/207 |
| 2011/0176038 | A1 | 7/2011 | Kurokawa et al. |
| 2011/0193768 | A1 | 8/2011 | Choi et al. |
| 2011/0221723 | A1 | 9/2011 | Kurokawa et al. |
| 2011/0310061 | A1 | 12/2011 | Ikeda et al. |
| 2012/0056861 | A1 | 3/2012 | Kurokawa et al. |
| 2012/0154337 | A1 | 6/2012 | Kurokawa et al. |
| 2013/0016035 | A1 | 1/2013 | Ikeda et al. |

FOREIGN PATENT DOCUMENTS

| | | |
|---|---|---|
| EP | 2 226 847 A2 | 9/2010 |
| JP | 60-198861 | 10/1985 |
| JP | 63-210022 | 8/1988 |
| JP | 63-210023 | 8/1988 |
| JP | 63-210024 | 8/1988 |
| JP | 63-215519 | 9/1988 |
| JP | 63-239117 | 10/1988 |

(56) References Cited

FOREIGN PATENT DOCUMENTS

| | | |
|---|---|---|
| JP | 63-265818 | 11/1988 |
| JP | 05-251705 | 9/1993 |
| JP | 08-264794 | 10/1996 |
| JP | 11-505377 | 5/1999 |
| JP | 2000-044236 | 2/2000 |
| JP | 2000-150900 | 5/2000 |
| JP | 2001-292276 | 10/2001 |
| JP | 2002-076356 | 3/2002 |
| JP | 2002-289859 | 10/2002 |
| JP | 2003-086000 | 3/2003 |
| JP | 2003-086808 | 3/2003 |
| JP | 2004-103957 | 4/2004 |
| JP | 2004-273614 | 9/2004 |
| JP | 2004-273732 | 9/2004 |
| JP | 2006-184888 A | 7/2006 |
| JP | 2006-285116 A | 10/2006 |
| JP | 2006-317682 | 11/2006 |
| JP | 2010-097618 A | 4/2010 |
| JP | 2010-191438 A | 9/2010 |
| JP | 2011-070658 A | 4/2011 |
| WO | WO2004/114391 A1 | 12/2004 |
| WO | WO-2006/059737 | 6/2006 |

OTHER PUBLICATIONS

Dembo.H et al., "RFCPUs on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the $In_2O_3$—$Ga_2ZnO_4$—ZnO system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)_m$ (m=3, 4, and 5), $InGaO_3(ZnO)_3$, and $Ga_2O_3(ZnO)_m$ (m=7, 8, 9, and 16) in the $In_2O_3$—$ZnGa_2O_4$—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films,", Appl. Phys. Lett. (Applied Physics Letters) , Sep. 13, 2004, vol. 85, No. 11, pp. 1993-1995.

Li.C et al., "Modulated Structures of Homologous Compounds $InMO_3(ZnO)_m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MoO_3$ as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUs on Flexible and Glass Substrates for Secure RFID Systems,", Journal of Solid-State Circuits , 2008, vol. 43, No. 1, pp. 292-299.

Ohara.H et al., "Amorphous In—Ga—Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn-Oxide TFTs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

(56) References Cited

OTHER PUBLICATIONS

Park.S et al., "Challenge to Future Displays: Transparent AM-OLED Driven by PEALD Grown ZnO TFT,", IMID '07 Digest, 2007, pp. 1249-1252.
Godo.H et al., "Temperature Dependence of Characteristics and Electronic Structure for Amorphous In—Ga—Zn-Oxide TFT,", AM-FPD '09 Digest of Technical Papers, Jul. 1, 2009, pp. 41-44.
Osada.T et al., "Development of Driver-Integrated Panel Using Amorphous In—Ga—Zn-Oxide TFT,", AM-FPD '09 Digest of Technical Papers, Jul. 1, 2009, pp. 33-36.
Hirao.T et al., "Novel Top-Gate Zinc Oxide Thin-Film Transistors (ZnO TFTs) for AMLCDs,", Journal of the SID, 2007, vol. 15, No. 1, pp. 17-22.
Hosono.H. "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn-Oxide TFT,", SID Digest '09 : SID International Symposium Digest of Technical Papers, May 31, 2009, pp. 1110-1112.
Ohara.H et al., "21.3:4.0 In. QVGA AMOLED Display Using In—Ga—Zn-Oxide TFTs With a Novel Passivation Layer,", SID Digest '09 : SID International Symposium Digest of Technical Papers, May 31, 2009, pp. 284-287.
Miyasaka.M, "SUFTLA Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.
Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.
Lee.H et al., "Current Status of, Challenges to, and Perspective View of AM-OLED ,", IDW '06 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.
Nakamura.M, "Synthesis of Homologous Compound with New Long-Period Structure,", NIRIM Newsletter, Mar. 1, 1995, vol. 150, pp. 1-4.
Kikuchi.H et al., "Polymer-Stabilized Liquid Crystal Blue Phases,", Nature Materials, Sep. 2, 2002, vol. 1, pp. 64-68.
Kimizuka.N et al., "Spinel, YbFe2O4, and Yb2Fe3O7 Types of Structures for Compounds in the In2O3 and SC2O3—A2O3—BO Systems [A; Fe, Ga, or Al; B: Mg, Mn, Fe, Ni, Cu,or Zn] at Temperatures Over 1000° C.,", Journal of Solid State Chemistry, 1985, vol. 60, pp. 382-384.
Kitzerow.H et al., "Observation of Blue Phases in Chiral Networks,", Liquid Crystals, 1993, vol. 14, No. 3, pp. 911-916.
Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.
Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.
Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.
Orita.M et al., "Mechanism of Electrical Conductivity of Transparent InGaZnO4,", Phys. Rev. B (Physical Review. B), Jan. 15, 2000, vol. 61, No. 3, pp. 1811-1816.
Nomura.K et al., "Amorphous Oxide Semiconductors for High-Performance Flexible Thin-Film Transistors,", Jpn. J. Appl. Phys. (Japanese Journal of Applied Physics), 2006, vol. 45, No. 5B, pp. 4303-4308.
Janotti.A et al., "Native Point Defects in ZnO,", Phys. Rev. B (Physical Review. B), Oct. 4, 2007, vol. 76, No. 16, pp. 165202-1-165202-22.
Park.J et al., "Electronic Transport Properties of Amorphous Indium-Gallium-Zinc Oxide Semiconductor Upon Exposure to Water,", Appl. Phys. Lett. (Applied Physics Letters), 2008, vol. 92, pp. 072104-1-072104-3.
Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.
Janotti.A et al., "Oxygen Vacancies in ZnO,", Appl. Phys. Lett. (Applied Physics Letters), 2005, vol. 87, pp. 122102-1-122102-3.
Oba.F et al., "Defect energetics in ZnO: A hybrid Hartree-Fock density functional study,", Phys. Rev. B (Physical Review. B), 2008, vol. 77, pp. 245202-1-245202-6.
Orita.M et al., "Amorphous transparent conductive oxide InGaO3(ZnO)m (m<4):a Zn4s conductor,", Philosophical Magazine, 2001, vol. 81, No. 5, pp. 501-515.
Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.
Mo.Y et al., "Amorphous Oxide TFT Backplanes for Large Size AMOLED Displays,", IDW '08 Proceedings of the 6th International Display Workshops, Dec. 3, 2008, pp. 581-584.
Kim.S et al., "High-Performance oxide thin film transistors passivated by various gas plasmas,", 214th ECS Meeting, 2008, No. 2317, ECS.
Clark.S et al., "First Principles Methods Using CASTEP,", Zeitschrift fur Kristallographie, 2005, vol. 220, pp. 567-570.
Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.
Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.
Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

\* cited by examiner

SEMICONDUCTOR DEVICE AND METHOD OF DRIVING THE SAME

BACKGROUND OF THE INVENTION

1. Field of the Invention

The present invention relates to a semiconductor device and a method of driving the semiconductor device. The present invention particularly relates to a method of driving the semiconductor device which detects a location where an object is touched in a touch panel including a self-light-emitting element.

It is to be noted that the semiconductor device in this specification refers to all devices that can function by utilizing semiconductor characteristics, and electro-optic devices, semiconductor circuits, and electronic devices are all semiconductor devices.

2. Description of the Related Art

In recent years, a display device provided with a touch sensor has attracted attention. The display device provided with a touch sensor is called a touch panel, a touch screen, or the like (hereinafter also referred to simply as a touch panel). Examples of the touch sensor include a resistive touch sensor, a capacitive touch sensor, and an optical touch sensor. Patent Document 1 discloses a display device provided with an optical touch sensor.

The accuracy of detecting the location of a touch is given as one of the indicators of performance of a touch panel. It can be said that the detection accuracy becomes higher as a difference becomes smaller between the location of an actual touch of an object on a display screen of a touch panel and a location detected by a sensing portion provided in a touch panel.

In a display device including an optical touch sensor, the optical sensor determines the existence of external light, thereby detecting the location of a touch. That is, with the touch of an object on the display screen, external light to be incident on the touch panel is blocked, so that a shadow of the object is formed on the touch panel. The gray scale image of the shadow is taken by the sensing portion. Thus, the location of the touch is detected from the gray scale of the shadow. Note that the gray scale of the shadow depends on external light detected by the sensing portion. In Patent Document 2, in order to increase detection accuracy, control is conducted so that only external light is detected by a sensing portion in an image-capture period. That is, a backlight is turned off in the image-capture period in the case of using a liquid crystal element as a display element, and no light is emitted (black is displayed) in the image-capture period in the case of using a self-light-emitting element.

REFERENCE

[Patent Document 1] Japanese Published Patent Application No. 2001-292276

[Patent Document 2] Japanese Published Patent Application No. 2006-317682

In Patent Document 2, in the image-capture period, the effect of light from the backlight or light from the self-light-emitting element is reduced and only external light is used to detect the location of a touch. Hence, when there is no external light or almost no external light during the image-capture period, a shadow of the object is hardly formed on the touch panel. That is, external light cannot be detected by the sensing portion, which leads to reduction in the accuracy of detecting the location of the touch.

Further, in order to make it possible to detect the location of a touch in a state without external light, a light source for illumination may be additionally provided; however, there arises a problem of increase in power consumption.

In view of the foregoing problems, an object is to improve the accuracy of detecting the location of a touch.

Another object is to reduce power consumption.

SUMMARY OF THE INVENTION

In an image-capture period, an imaging data of an object over a touch panel is taken when black is displayed on a display screen (when all self-light-emitting elements in the touch panel are in a non-light-emitting state) and when white is displayed on the display screen (when all the self-light-emitting elements in the touch panel are in a light-emitting state). A plurality of sensor pixels is provided in the touch panel, and each sensor pixel outputs imaging data of the object imaged at the time of the black display and imaging data of the object imaged at the time of the white display. The location of the sensor pixel where a difference between the two pieces of imaging data output from the same sensor pixel is the greatest is detected as the location of a touch of the object. With the use of both imaging data at the time of the black display and imaging data at the time of the white display, the effect of external light can be reduced.

Light emission from the self-light-emitting element is controlled by turning on and off two transistors which are provided for a display pixel in the touch panel and electrically connected to the self-light-emitting element. In the image-capture period, one of the transistors is turned off, the other of the transistors is turned on, and all of the self-light-emitting elements in the touch panel are made to emit light so as to display white on the display screen. Further, one of the transistors is turned off, the other of the transistors is turned off, and all of the self-light-emitting elements in the touch panel are made to emit no light so as to display black on the display screen.

One embodiment of the present invention disclosed in this specification is a semiconductor device including a display pixel having a first transistor, a second transistor, light-emitting element, a first display pixel control signal line, and a second display pixel control signal line, and a sensor pixel having a third transistor, a light-receiving element, and an image-capture pixel control signal line. In addition, a gate terminal of the first transistor and the first display pixel control signal line are electrically connected to each other, a gate terminal of the second transistor and the second display pixel control signal line are electrically connected to each other, a gate terminal of the third transistor and the image-capture pixel control signal line are electrically connected to each other, one of a source terminal and a drain terminal of the first transistor and the light-emitting element are electrically connected to each other at a first node, one of a source terminal and a drain terminal of the second transistor and the light-emitting element are electrically connected to each other at the first node, and one of a source terminal and a drain terminal of the third transistor and the light-receiving element are electrically connected to each other.

In the above semiconductor device, each of the first transistor, the second transistor, and the third transistor may include an oxide semiconductor layer. Further, the oxide semiconductor layer may include indium, gallium, and zinc, and may include a c-axis aligned crystal.

In the above semiconductor device, the third transistor may overlap with the light-emitting element.

In the above semiconductor device, a plurality of display pixels is provided with respect to one sensor pixel.

Another embodiment of the present invention disclosed in this specification is a method for driving a semiconductor device including a touch panel including a plurality of display pixels and a plurality of sensor pixels, including the following steps: obtaining a first imaging data by using the sensor pixels in a first period where white is displayed on a display screen of the touch panel; obtaining a second imaging data by using the sensor pixels in a second period where black is displayed on the display screen of the touch panel; and detecting a sensor pixel where a difference between the first imaging data and the second imaging data is greatest.

In the above method for driving a semiconductor device, the plurality of display pixels each include a first transistor and a second transistor, a first gate terminal of the first transistor is electrically connected to a first display pixel control signal line, a second gate terminal of the second transistor is electrically connected to a second display pixel control signal line, a first low potential is applied to the first display pixel control signal line, and a first high potential is applied to the second display control signal line in the first period, and the first low potential is applied to the first display pixel control signal line, and a second low potential is applied to the second display control signal line in the second period.

In the above method for driving a semiconductor device, the plurality of sensor pixels each include a third transistor, a third gate terminal of the third transistor is electrically connected to an image-capture pixel control signal line, and a second high potential is applied to the image-capture pixel control signal line in the first period and the second period.

In the above method for driving a semiconductor device, the steps may include displaying a still image or a moving image by input of a video signal potential to the plurality of display pixels between the first period and the second period.

Note that, in this specification, a term "data display period" refers to a period in which an image is displayed on a display screen. Further, a term "image-capture period" refers to a period in which an imaging data of an object over a touch panel is taken and the location of a touch of the object on the display screen is detected.

Note also that, in this specification, "external light" refers to light other than controllable light.

In the image-capture period, imaging data at the time of white display and imaging data at the time of black display are output from each sensor pixel. Further, the location of the sensor pixel where a difference between the two pieces of imaging data is the greatest is detected. Thus, the location of a touch of the object on the display screen is detected with high accuracy. By utilizing a difference between imaging data at the time of the black display and imaging data at the time of the white display, the effect of external light can be reduced.

DETAILED DESCRIPTION OF THE INVENTION

Figure 1A:
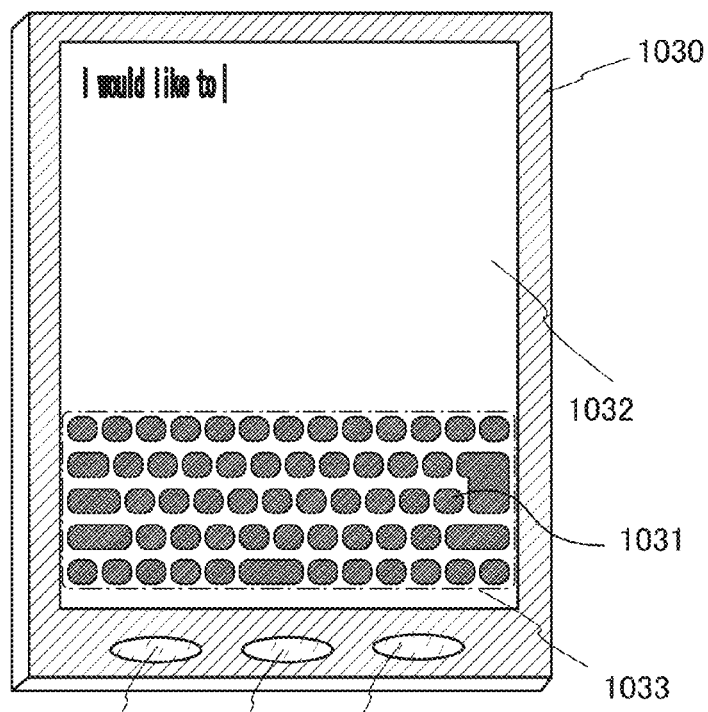
FIGS. 1A and 1B are external views illustrating one embodiment of the present invention.

Embodiments are described in detail with reference to the drawings. Note that the invention is not limited to the following description, and it will be easily understood by those skilled in the art that various changes and modifications can be made without departing from the spirit and scope of the invention. Therefore, the invention should not be construed as being limited to the description in the following embodiments. Note that in the structures of the invention described below, the same portions or portions having similar functions are denoted by the same reference numerals in different drawings, and description of such portions is not repeated.

Embodiment 1

Figure 1B:
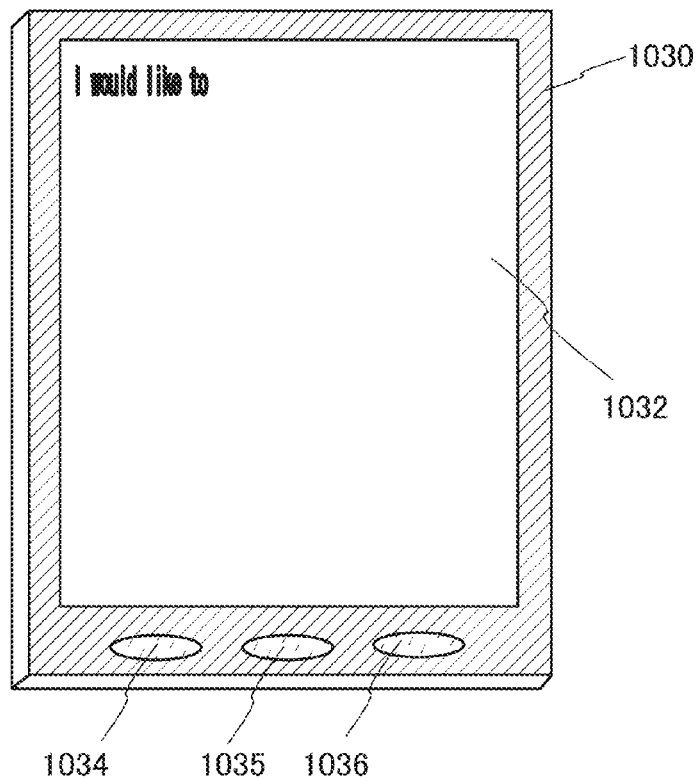

In this embodiment, an example of a semiconductor device including a touch panel is shown in FIGS. 1A and 1B. In the semiconductor device, in an image-capture period, light emission from a self-light-emitting element is controlled, and the location of a sensor pixel where a difference between imaging data of an object imaged at the time of displaying black on a display screen and imaging data of the object imaged at the time of displaying white on the display screen is the greatest is detected as the location of a touch.

A touch panel 1032 of an electronic device 1030 has a touch-input function with the use of photo sensors, in which a plurality of keyboard buttons 1031 is displayed on a region 1033 in the display screen of the touch panel 1032 as illustrated in FIG. 1A. A user inputs data by touching desired keyboard buttons, whereby a result of the input is displayed on the display screen of the display panel 1032.

In the display screen of the display panel 1032, a still image or a moving image is displayed in the data display period, and black or white is displayed on the entire display screen in the image-capture period.

Note that the region 1033 displays a still image, and a display element control circuit is brought to a non-operation state in a period other than writing time, whereby power consumption can be reduced.

An example of the usage of the electronic device 1030 is described. For example, letters are input by touching the keyboard buttons displayed on the region 1033 with a finger, a stylus, or the like, and text which is displayed as a result of the input is displayed on a region other than the region 1033. When an output signal of the photo sensor is not detected for a set period of time, the keyboard displayed on the region 1033 is removed automatically and the input text is displayed also on the region 1033, so that the user can see the input text displayed on all the region of the screen. In the case where input is performed again, the keyboard buttons can be displayed on the region 1033 again by touch of the display screen of the touch panel with the finger, the stylus, or the like and by detection of the output signal of the photo sensor, whereby input of letters can be performed.

Note that in accordance with an electronic device in this embodiment, detection of a touch of a finger, a stylus, or the like on the touch panel 1032 can reduce the effect of external light. This is because, in the image-capture period, not only external light but also light emitted from the self-light-emitting element is used. Each sensor pixel in the touch panel 1032 outputs imaging data of the object imaged with the use of only external light (at the time of displaying black on the display screen) and imaging data of the object imaged with the use of external light and the self-light-emitting element (at the time of displaying white on the display screen). The location of a sensor pixel where a difference between the imaging data at the time of white display and the imaging data at the time of black display is the greatest is detected as the point of a touch of the finger, the stylus, or the like. Thus, detection with high accuracy is possible.

Alternatively, display of the keyboard can be removed not automatically but by pressing a switch 1034 by the user so that the entire display screen of the touch panel 1032 can display a still image, a moving image, white, and black in a switchable manner as illustrated in FIG. 1B. In addition, even when power is turned off by pressing a power supply switch 1035, the still image can be held for a long time. Further, the keyboard can be displayed by pressing a keyboard display switch 1036 to be in a state where touch-input can be performed.

In addition, the switch 1034, the power supply switch 1035, and the keyboard display switch 1036 may each be displayed on the display screen of the touch panel 1032 as a switch button. Each operation may be performed by input by touching the displayed switch button.

Further, without limitation to the structure in which the region 1033 in the touch panel displays a still image, the region 1033 may display a moving image temporarily or partly. For example, a position where the keyboard buttons are displayed may be changed temporarily depending on user's preference, or only display of a keyboard button by which input is performed may be partly changed in accordance with the degree of accuracy of detecting a portion of a touch of a stylus or the like in order to confirm that whether the input by the keyboard button is performed.

The electronic device 1030 includes at least a battery, and preferably includes a memory for storing data (e.g., a flash memory circuit, an SRAM circuit, or a DRAM circuit), a central processing unit (CPU), or a logic circuit. With a CPU or a memory, various kinds of software can be installed and thus, the electronic device 1030 can have part or all of the functions of a personal computer.

Figure 2A:
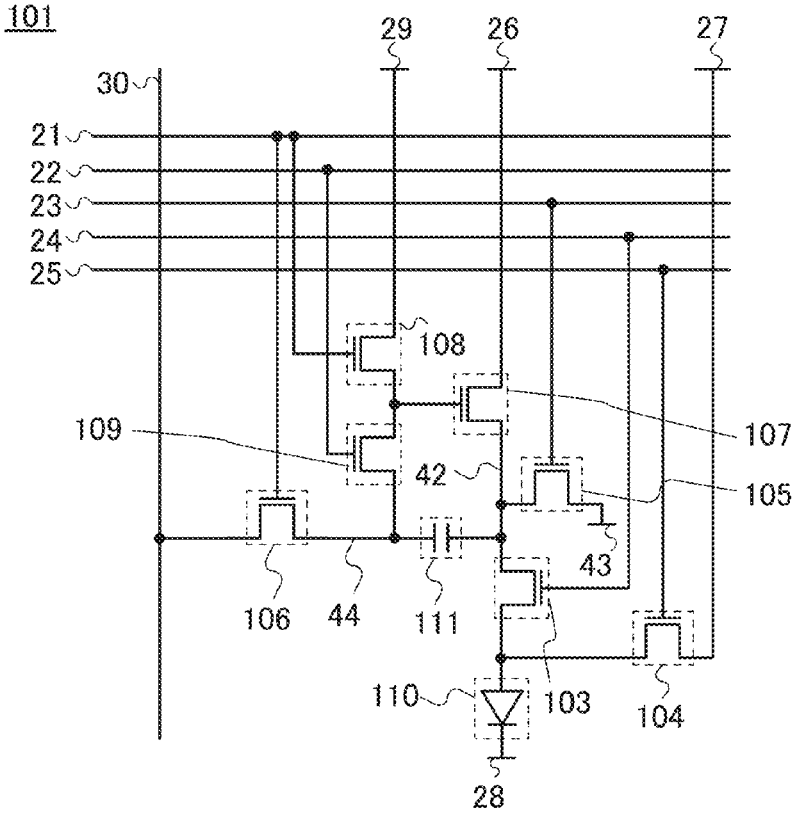
FIGS. 2A and 2B are circuit diagrams illustrating one embodiment of the present invention.
Figure 2B:
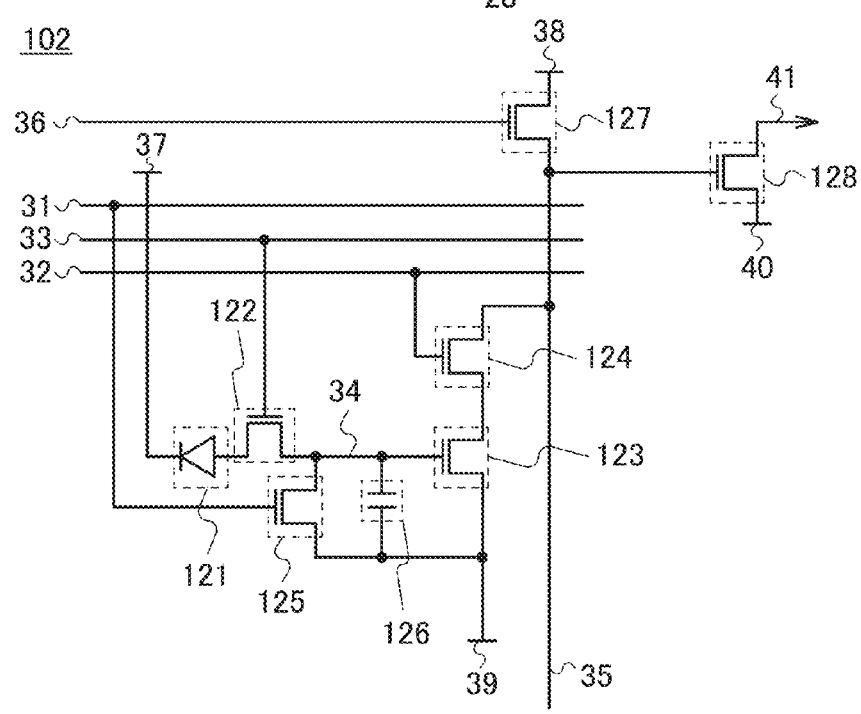
Figure 3:
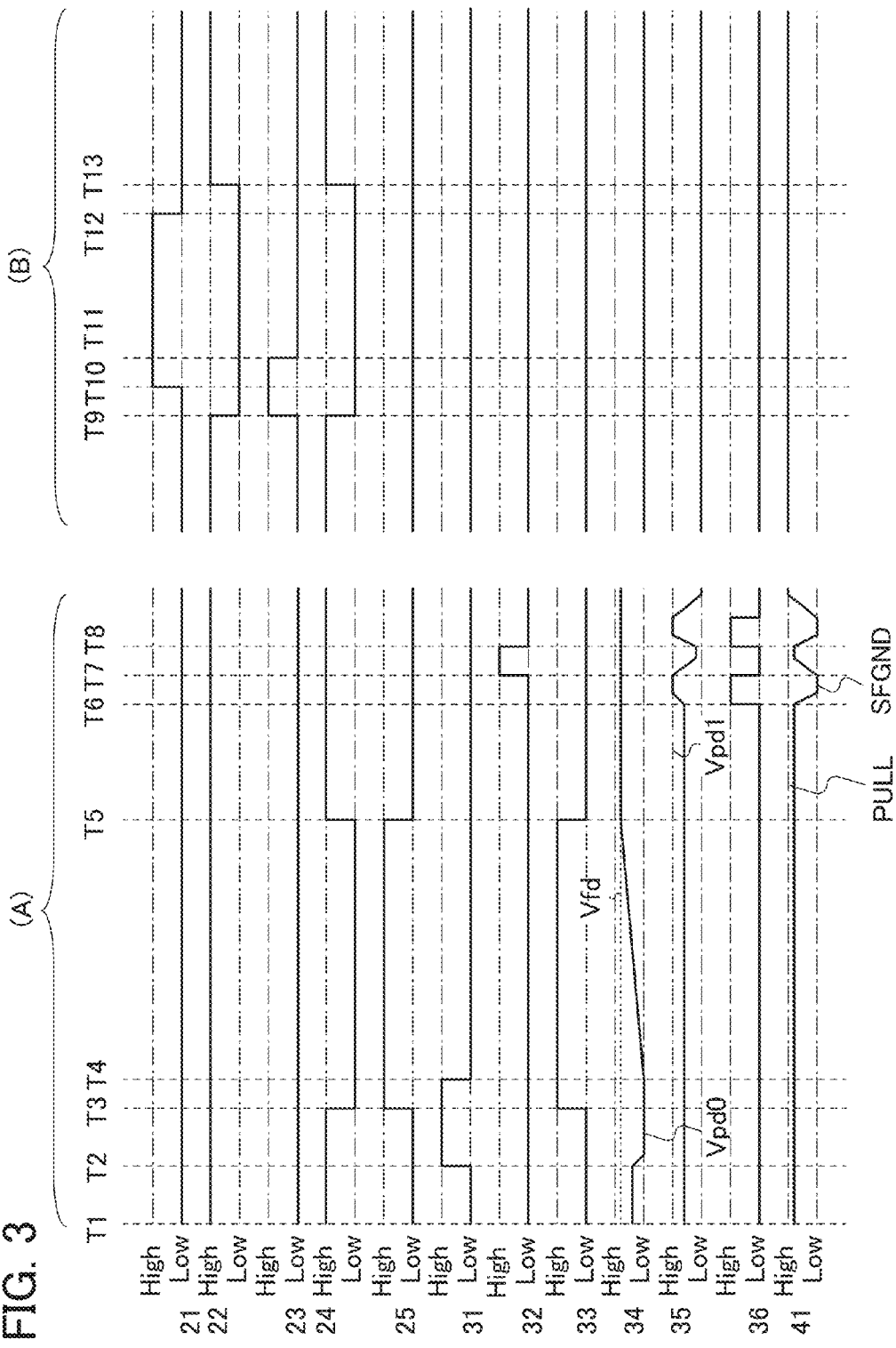
FIG. 3 shows timing charts of circuit diagrams illustrating one embodiment of the present invention.

Next, examples of configurations of a display pixel and a sensor pixel included in the touch panel 1032 are described with reference to FIGS. 2A and 2B and FIG. 3. FIGS. 2A and 2B are circuit diagrams. FIG. 3 shows timing charts of the display pixel and the sensor pixel in FIGS. 2A and 2B.

The touch panel 1032 includes a plurality of display pixels 101 and a plurality of sensor pixels 102. The display pixels 101 and the sensor pixels 102 are arranged in a matrix of rows and columns. Note that the number of display pixels provided with respect to one sensor pixel is not limited in particular. The number of sensor pixels may be the same as the number of display pixels, or one sensor pixel may be provided with respect to two display pixels. In this specification, an example of providing one sensor pixel with respect to three display pixels (RBG) is described.

The display pixel 101 in FIG. 2A includes a transistor 103, a transistor 104, a transistor 105, a transistor 106, a transistor 107, a transistor 108, a transistor 109, a self-light-emitting element 110, a capacitor 111, a first display pixel control signal line 21, a second display pixel control signal line 22, a third display pixel control signal line 23, a fourth display pixel control signal line 24, a fifth display pixel control signal line 25, a power supply line 26, a power supply line 27, a ground line 28, a power supply line 29, a signal line 30, a node 42, a node 44, and a power supply line 43. Note that the display pixel included in the touch panel 1032 is not limited to this configuration.

The self-light-emitting element 110 is not limited in particular, and an OLED, an LED, or the like can be used.

The transistor 103 and the transistor 104 control a light-emission state of the self-light-emitting element 110. In the case where, for example, the transistor 103 is in an off state and the transistor 104 is in an on state, the self-light-emitting element 110 is in a light-emitting state, so that white is displayed on a display screen of the display pixel 101. Further, in the case where, for example, the transistor 103 is in an off state and the transistor 104 is in an off state, the self-light-emitting element 110 is in a non-light-emitting state, so that black is displayed on the display screen of the display pixel 101.

The sensor pixel 102 in FIG. 2B includes a light-receiving element 121, a transistor 122, a transistor 123, a transistor 124, a transistor 125, a capacitor 126, a transistor 127, a transistor 128, an image-capture pixel control signal line (TX) 33, an image-capture pixel control signal line (PR) 31, an image-capture pixel control signal line (SE) 32, a node (FD) 34, an output signal line 35, an output reset signal line (BR) 36, a power supply line 37, a power supply line 38, a power supply line 39, a ground line 40, and a signal line (READOUT) 41.

Note that the light-receiving element 121 may include at least a photoelectric conversion layer which generates photocurrent by receiving light, and a pair of electrodes between which the photoelectric conversion layer is provided. There is no particular limitation on the configuration of the light-receiving element 121, and a photodiode or the like may be used.

Note that as the configuration of the sensor pixel included in the touch panel 1032, a known configuration can be used.

A display pixel control circuit (not shown) is a circuit for controlling the display pixel 101 and is provided for the touch panel 1032. A sensor pixel control circuit (not shown) is a circuit for controlling the sensor pixel 102 and is provided for the touch panel 1032.

Note that the sensor pixel control circuit can control the display pixel 101 concurrently with the control of the sensor pixel 102. Thus, it is possible to perform imaging by the sensor pixel 102 in synchronization with a period in which white is displayed on the display screen of the display pixel 101. Similarly, it is possible to perform imaging by the sensor pixel 102 in synchronization with a period in which black is displayed on the display screen of the display pixel 101.

One of a source terminal and a drain terminal of the transistor 103, one electrode of the self-light-emitting element 110, and one of a source terminal and a drain terminal of the transistor 104 are electrically connected to each other. The other electrode of the self-light-emitting element 110 and the ground line 28 are electrically connected to each other. The other of the source terminal and the drain terminal of the transistor 104 and the power supply line 27 are electrically connected to each other. A gate terminal of the transistor 104 and the fifth display pixel control signal line 25 are electrically connected to each other. A gate terminal of the transistor 103 and the fourth display pixel control signal line 24 are electrically connected to each other. The other of the source terminal and the drain terminal of the transistor 103, one of a source terminal and a drain terminal of the transistor 105, one terminal of the capacitor 111, and one of a source terminal and a drain terminal of the transistor 107 are electrically connected to each other. The other of the source terminal and the drain terminal of the transistor 107 and the power supply line 26 are electrically connected to each other. A gate terminal of the transistor 107, one of a source terminal and a drain terminal of the transistor 108, and one of a source terminal and a drain terminal of the transistor 109 are electrically connected to each other. The other of the source terminal and the drain terminal of the transistor 108 and the power supply line 29 are electrically connected to each other. A gate terminal of the transistor 108, a gate terminal of the transistor 106, and the first display pixel control signal line 21 are electrically connected to each other. The other of the source terminal and the drain terminal of the transistor 109, the other terminal of the capacitor 111, and one of a source terminal and a drain terminal of the transistor 106 are electrically connected to each other. The other of the source terminal and the drain terminal of the transistor 106 and the signal line 30 are electrically connected to each other. A gate terminal of the transistor 109 and the second display pixel control signal line 22 are electrically connected to each other. A gate terminal of the transistor 105 and the third display pixel control signal line 23 are electrically connected to each other. The other of the source terminal and the drain terminal of the transistor 105 and the power supply line 43 are electrically connected to each other.

One of a source terminal and a drain terminal of the transistor 122, one of a source terminal and a drain terminal of the transistor 125, one terminal of the capacitor 126, and a gate terminal of the transistor 123 are electrically connected to each other (node 34). A gate terminal of the transistor 122 and the image-capture pixel control signal line (TX) 33 are electrically connected to each other. The other of the source terminal and the drain terminal of the transistor 122 and one electrode of the light-receiving element 121 are electrically connected to each other. The other electrode of the light-receiving element 121 and the power supply line 37 are electrically connected to each other. A gate terminal of the transistor 125 and the image-capture pixel control signal line (PR) 31 are electrically connected to each other. The other of the source terminal and the drain terminal of the transistor 125, the other terminal of the capacitor 126, one of a source terminal and a drain terminal of the transistor 123, and the power supply line 39 are electrically connected to each other. The other of the source terminal and the drain terminal of the transistor 123 and one of a source terminal and a drain terminal of the transistor 124 are electrically connected to each other. The other of the source terminal and the drain terminal of the transistor 124, the output signal line 35, a gate terminal of the transistor 128, and one of a source terminal and a drain terminal of the transistor 127 are electrically connected to each other. A gate terminal of the transistor 124 and the image-capture pixel control signal line (SE) 32 are electrically connected to each other. The other of the source terminal and the drain terminal of the transistor 127 and the power supply line 38 are electrically connected to each other. A gate terminal of the transistor 127 and the output reset signal line (BR) 36 are electrically connected to each other. One of a source terminal and a drain terminal of the transistor 128 and the ground line 40 are electrically connected to each other. The other of the source terminal and the drain terminal of the transistor 128 and the signal line (READOUT) 41 are electrically connected to each other.

Next, timing charts illustrating the operations of the display pixels and the operations of the sensor pixels are shown in FIG. 3. Note that for the illustration of the operations of the display pixels and the operations of the sensor pixels, an image-capture period (A) and a data display period (B) in FIG. 3 are described separately. In the image-capture period (A), the operations of the display pixels and the operations of the sensor pixels are synchronized, and white is displayed on the entire display screen and black is displayed on the entire display screen to detect the location of a touch of an object on the display screen. In the data display period (B), the display pixel is operated and video data (including a moving image and a still image) is displayed on the display screen.

Although FIG. 3 shows the operations when these pixels are operated by global shutter driving for example, the driving method of the present invention is not limited thereto. Rolling shutter driving or the like may be used.

The period (A) in FIG. 3 illustrates the operations of the display pixels and the operations of the sensor pixels at the time when white is displayed on the entire display screen, i.e., all self-light-emitting elements in the touch panel are in a light-emitting state.

Note that in the timing charts shown in FIG. 3, a high-level power supply potential (a high potential) VDD is denoted by "High" (hereinafter also referred to as "H") and a low-level power supply potential (a low potential) VSS is denoted by "Low" (hereinafter also referred to as "L").

At a time T1, the first display pixel control signal line 21 is set to "L", the second display pixel control signal line 22 is set to "H", the third display pixel control signal line 23 is set to "L", the fourth display pixel control signal line 24 is set to "H", the fifth display pixel control signal line 25 is set to "L", the image-capture pixel control signal line (PR) 31 is set to "L", the image-capture pixel control signal line (SE) 32 is set to "L", the image-capture pixel control signal line (TX) 33 is set to "L", and the output reset signal line (BR) 36 is set to "L".

Note that at the time T1, video voltage corrected by a correction circuit provided for the display pixel is written to the display pixel. The self-light-emitting element emits light depending on the corrected video voltage. Further, at the time T1, the sensor pixel is in a state of completing reading of imaging data after an image-capture operation and is in a retrace interval before a next frame.

At a time T2, a reset operation is started when the image-capture pixel control signal line (PR) 31 is set to "H". Since the image-capture pixel control signal line (PR) 31 is set to "H", the transistor 125 is turned on. The node (FD) 34 is reset to a potential Vpd0 of the power supply line 39.

At a time T3, an image-capture preparation operation is started when the fourth display pixel control signal line 24 electrically connected to the gate terminal of the transistor 103 is set to "L", the fifth display pixel control signal line 25 electrically connected to the gate terminal of the transistor 104 is set to "H", and the image-capture pixel control signal line (TX) 33 is set to "H". Note that the image-capture pixel control signal line (PR) 31 is maintained at "H". At this time, since the transistor 103 is turned off, current supply from the transistor 103 to the self-light-emitting element 110 is stopped. Further, since the transistor 104 is turned on, the power supply line 27 and the self-light-emitting element 110 are directly connected to each other via the transistor 104. Hence, current flows in the self-light-emitting element 110 without current control, so that the self-light-emitting element 110 emits light.

At this time, the self-light-emitting elements in all of the display pixels in the touch panel emit light, and thus, white is displayed on the entire display screen.

Further, the transistor 122 is turned on. The light-receiving element 121 detects light, whereby current in a reverse direction (hereinafter referred to as reverse current) flows from the node (FD) 34 to the power supply line 37 via the light-receiving element 121.

Note that during the image-capture preparation operation (the time T3 to the time T4), since the image-capture pixel control signal line (PR) 31 is maintained at "H", the potential of the node (FD) 34 is held at the potential Vpd0 of the power supply line 39.

At a time T4, the image-capture operation is started when the image-capture pixel control signal line (PR) 31 is set to "L". Since the image-capture pixel control signal line (PR) 31 is set to "L", the transistor 125 is turned off. At this time, the potential Vpd0 of the node (FD) 34 is in a reset state. The image-capture pixel control signal line (TX) 33 is maintained at "H".

When light is received by the light-receiving element 121 after the time T4, reverse current flows in the light-receiving element 121. Since the fourth display pixel control signal line 24 is maintained at "L" and the fifth display pixel control signal line 25 is maintained at "H", the self-light-emitting element 110 is in a light-emitting state.

For example, in the case where a finger of a human touches the display screen of a panel when the self-light-emitting element 110 is in a light-emitting state and white is displayed, the light-receiving element 121 receives light reflected by the finger of the human. Hence, there is a difference in the amount of light incident on the light-receiving element 121 between a portion where the finger exists over the touch panel and touches the display screen and a portion where the finger exists over the touch panel and does not touch the display screen. The sum of the amount of the reflected light from the self-light-emitting element 110 and the amount of the external light other than that blocked by the finger is incident on the sensor pixel disposed in the portion where the finger touches the display screen. Only external light other than that blocked by the finger is incident on the sensor pixel disposed in the portion where the finger does not touch the display screen (the details will be described later; see FIGS. 4A and 4B).

Note that change in the potential of the node (FD) 34 depends on the amount of light (light intensity) incident on the light-receiving element 121. In this case, charge depending on reverse current flowing in the light-receiving element 121 is accumulated in the node (FD) 34, and change in the amount of the charge corresponds to change in the potential of the node (FD) 34.

At a time T5, the fourth display pixel control signal line 24 is set to "H", and the fifth display pixel control signal line 25 is set to "L", whereby the image-capture operation is finished. Since the image-capture pixel control signal line (TX) 33 is set to "L", the transistor 122 is turned off. At this time, the image-capture operation is completed, and thus, the potential of the node (FD) 34 is fixed to a potential Vfd.

Further, since light emission from the self-light-emitting elements in all of the display pixels in the touch panel is finished, the display screen of the display pixels ceases to display white. At the same time, the self-light-emitting element 110 emits light depending on the corrected video voltage at the time T2 (or the time T1), so that the display is resumed. That is, the self-light-emitting element 110 in a non-light-emitting state is included.

At a time T6, an output reset operation is started when the output reset signal line (BR) 36 is set to "H". At this time, the transistor 127 is turned on. The potential of the output signal line 35 becomes a potential Vpd1 of the power supply line 38. The potential of the signal line (READOUT) 41 becomes a potential SFGND of the ground line 40.

At a time T7, an image-capture data reading operation is started when the output reset signal line (BR) 36 is set to "L" and the image-capture pixel control signal line (SE) 32 is set to "H". Since the output reset signal line (BR) 36 is set to "L", the transistor 127 is turned off. At this point, the potential of the output signal line 35 is maintained at the potential Vpd1 of the power supply line 38. Further, the transistor 124 is turned on. Furthermore, on-state current depending on the potential Vfd that is the potential of the node (FD) 34 flows in the transistor 123. Hence, the potential of the output signal line 35 is uniquely determined.

Further, the potential of the output signal line 35 is applied to the gate terminal of the transistor 128. Resistive division using an external circuit and the transistor 128 determines the potential of the signal line (READOUT) 41. Imaging data is output from each sensor pixel based on the potential of the signal line (READOUT) 41, and an image produced from each imaging data is obtained as an imaging result (the result of imaging an object, e.g., a finger of a human, over the display screen).

At a time T8, the image-capture data reading operation is finished when the image-capture pixel control signal line (SE) 32 is set to "L". The transistor 124 is turned off, so that the image-capture data reading operation is completed. At this time, the output signal line 35 is set to "L", and the output reset signal line (BR) 36 is set to "H".

By the operations from the time T1 to the time T8 as described above, a sequence of operations of the display pixel and the sensor pixel in the image-capture period is completed.

Next, the operations of the display pixels and the operations of the sensor pixels when black is displayed on the entire display screen, i.e., all the self-light-emitting elements in the touch panel are in a non-light-emitting state are described.

The operations of the display pixels and the operations of the sensor pixels at the time of displaying black on the entire display screen are the same as the operations of the display pixels and the operations of the sensor pixels at the time of displaying white on the entire display screen in a period from the time T1 to the time T3 and a period from the time T5 to the time T8, except in a period from the time T3 to the time T5. Hence, for details of the operations, the description of the operations at the time of displaying white on the entire display screen can be referred to.

In displaying black on the entire display screen, the potential of the fifth display pixel control signal line 25 is set to "L" in the period from the time T3 to the time T5 shown in the period (A) of FIG. 3.

At the time T3, the transistor 103 is turned off, so that current supply from the transistor 103 to the self-light-emitting element 110 is stopped. Further, the transistor 104 is turned off, so that current supply from the transistor 104 to the self-light-emitting element 110 is stopped. Hence, current does not flow in the self-light-emitting element 110, and the self-light-emitting element 110 does not emit light.

At this time, since the self-light-emitting elements in all of the display pixels in the touch panel are in a non-light-emitting state, black is displayed on the entire display screen.

In a period from the time T4 to the time T5, the fourth display pixel control signal line 24 is maintained at "L", and the fifth display pixel control signal line 25 is maintained at "L", so that the self-light-emitting element 110 is in a non-light-emitting state.

For example, in the case where a finger of a human touches the display screen of the panel when the self-light-emitting element 110 is in a non-light-emitting state and black is displayed, the light-receiving elements 121 receive only external light other than that blocked by the finger. Only external light other than that blocked by the finger is incident on the light-receiving elements 121. There is a difference in the amount of light incident on the light-receiving element 121 between a portion where the finger exists over the touch panel and touches the display screen and a portion where the finger exists over the touch panel and does not touch the display screen. The amount of external light detected by the sensor pixel disposed in the portion where the finger touches the display screen is smaller than that detected by the sensor pixel disposed in the portion where the finger does not touch the display screen. This is because much more external light is blocked by the touch of the finger on the display screen (the details will be described later; see FIGS. 4C and 4D).

The period (B) in FIG. 3 illustrates the operations of the display pixels and the operations of the sensor pixels in the data display period. The operations of the display pixels and the operations of the sensor pixels are described with reference to the timing charts shown in FIG. 3.

A state before a time T9 is similar to the state at the time T1. That is, the first display pixel control signal line 21 is set to "L", the second display pixel control signal line 22 is set to "H", the third display pixel control signal line 23 is set to "L", the fourth display pixel control signal line 24 is set to "H", the fifth display pixel control signal line 25 is set to "L", the image-capture pixel control signal line (PR) 31 is set to "L", the image-capture pixel control signal line (SE) 32 is set to "L", the image-capture pixel control signal line (TX) 33 is set to "L", and the output reset signal line (BR) 36 is set to "L".

At the time T9, an initialization operation is started when the second display pixel control signal line 22 is set to "L", the third display pixel control signal line 23 is set to "H", and the fourth display pixel control signal line 24 is set to "L". The transistor 103 is turned off. The transistor 109 is turned off. Further, the transistor 105 is turned on, so that the potential of the node 42 is initialized to an initialization potential V1 that is a potential of the power supply line 43.

At a time T10, a video voltage writing operation is started when the first display pixel control signal line 21 is set to "H". Since the first display pixel control signal line 21 is set to "H", the transistor 106 and the transistor 108 are turned on. A video signal potential Vdata is input from the signal line 30 to the node 44 via the transistor 106. Further, via the transistor 108, the potential of the gate terminal of the transistor 107 is reset to the potential V0 that is the potential of the power supply line 29.

At a time T11, a threshold value correction operation is started when the third display pixel control signal line 23 is set to "L". The transistor 105 is turned off, so that supply of the initialization potential V1 is stopped. Note that the first display pixel control signal line 21 is maintained at "H", the second display pixel control signal line 22 is maintained at "L", and the fourth display pixel control signal line 24 is maintained at "L".

Since the potential V0 is applied to the gate terminal of the transistor 107, current flows in the node 42 from the power supply line 26 via the transistor 107. As a result, the potential of the node 42 becomes a potential obtained by subtracting a threshold voltage potential Vth of the transistor 107 from the potential V0 of the power supply line 29. At this time, since the node 44 is at the potential Vdata, a potential Vcs to be held in the capacitor 111 is Vdata+Vth−V0.

At a time T12, the threshold value correction operation is finished when the first display pixel control signal line 21 is set to "L". The transistor 106 and the transistor 108 are turned off. At this time, as for each node, the gate terminal of the transistor 107 is held at the potential V0, the node 42 is held at a potential (V0−Vth), and the node 44 is held at the potential Vdata.

At a time T13, a light emission operation is started when the second display pixel control signal line 22 is set to "H" and the fourth display pixel control signal line 24 is set to "H". Since the second display pixel control signal line 22 is set to "H", the transistor 109 is turned on, and the potential of the gate terminal of the transistor 107 becomes a video potential Vdata, so that the potential (Vdata+Vth−V0) is applied between the one of the source terminal and the drain terminal of the transistor 107 and the gate terminal of the transistor 107. As a result, drain current Id in the transistor 107 is such that $Id \propto (Vgs-Vth)^2 = (Vdata+V0)^2$. Thus, it is possible to supply current which is not affected by variation in the threshold voltage potential Vth of the transistor 107, thereby completing the correction operation.

Further, since the fourth display pixel control signal line 24 is set to "H", the transistor 103 is turned on. Current Id controlled by the transistor 107 is supplied to the self-light-emitting element 110, whereby light emission is started.

After the time T13, a light-emitting state is maintained while the corrected potential is applied to the gate terminal of the transistor 107.

By the operations from the time T9 to the time T13 described above, a sequence of operations of the display pixels and the sensor pixels in the data display period is completed.

Note that the image-capture period at the time of displaying white on the entire display screen and the image-capture period at the time of displaying black on the entire display screen may be contiguous to the data display period or may be separated from the data display period. Further, the operations from the time T6 to the time T8 in the image-capture period can be performed in the data display period. When part of the image-capture period is performed in the data display period, it is possible to shorten time for detecting the location of the touch, which leads to improvement in response speed of touch operation in the display device.

Next, the mechanism of detection of the location of the touch when the object touches the display screen of the touch panel according to one embodiment of the present invention is described with reference to FIGS. 4A to 4D.

Figure 4A:
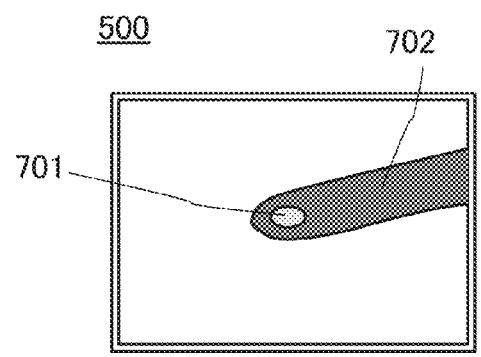
FIGS. 4A to 4D are schematic views illustrating one embodiment of the present invention.
Figure 4B:
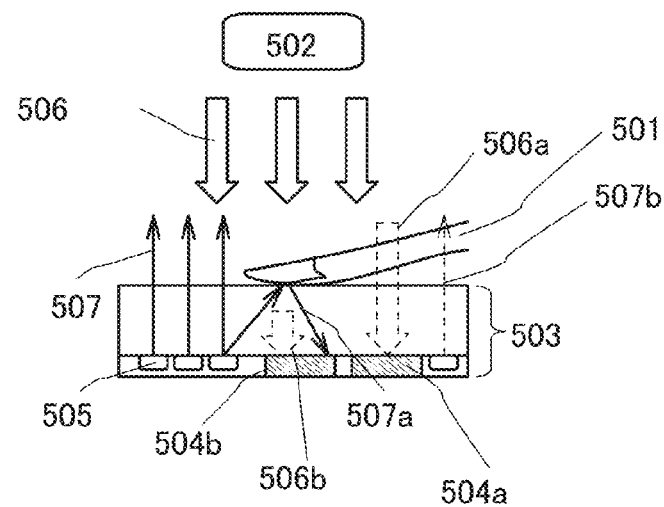
Figure 4C:
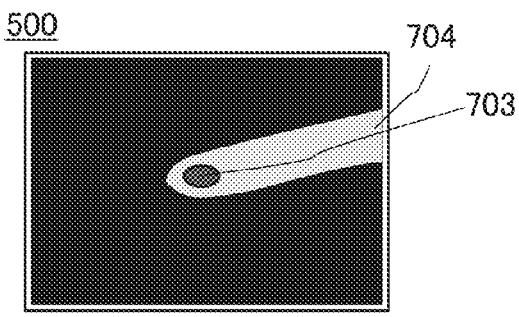
Figure 4D:
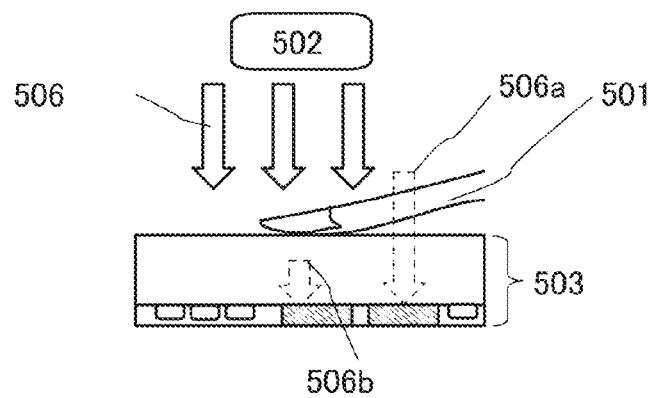

FIGS. 4A and 4C are schematic views illustrating the case where a finger touches the display screen of the touch panel. FIGS. 4B and 4D are schematic views of the state of light when a finger touches the display screen of the touch panel according to one embodiment of the present invention. In FIGS. 4B and 4D, the state of light is seen from a lateral view.

In FIGS. 4A to 4D, the following are shown for illustrative purposes: a display screen 500 of a touch panel 503; an object (finger) 501; a light source 502; a photo sensor 504a; a photo sensor 504b; external light 506; light 507 emitted from a self-light-emitting element 505; a shadow 701; a shadow 702; a shadow 703; and a shadow 704.

First, the mechanism of detection of the location of a touch in the case where the display screen displays white (in the case where all the self-light-emitting elements in the touch panel are in a light-emitting state) is described with reference to FIGS. 4A and 4B.

As shown in FIG. 4B, a finger touches the touch panel 503. At this time, the external light 506 emitted from the light source 502 is incident on the object (finger) 501 and the touch panel 503. Further, the self-light-emitting element 505 emits the light 507 toward the outside of the touch panel 503.

In a portion where the finger 501 does not exist over the touch panel 503, the emitted light 507 is transmitted and the external light 506 is incident on the photo sensor. Thus, the external light 506 can be detected by the photo sensor. In a portion where the finger 501 exists over the touch panel 503 and the finger 501 touches directly the touch panel 503, the emitted light 507 is reflected due to the touch with the finger 501, and reflected light 507a is incident on the photo sensor 504b. In a portion where the finger 501 exists over the touch panel 503 and the finger 501 does not touch directly the touch panel 503, the emitted light 507 is slightly transmitted through the finger 501 and becomes light 507b.

In the portion where the finger 501 touches directly the touch panel 503, the external light 506 is considerably blocked. However, since the external light 506 is not completely blocked, a small amount of the external light 506b can be detected by the photo sensor 504b. In the portion where the finger 501 does not touch directly the touch panel 503, the external light 506 is slightly blocked. External light 506a, the amount (intensity) of which is greater than that of the external light 506b, can be detected by the photo sensor 504a.

That is, the amount of light detected by the photo sensor 504b at the touch location corresponds to the sum of the amount of light 507 emitted from the self-light-emitting element 505 and the amount of external light 506 (the reflected light 507a+the external light 506b). The amount (intensity) of light detected by the photo sensor 504b depends on the gray scale of the shadow of the finger 501.

A state of the display screen 500 of the touch panel 503 at this time is described with reference to FIG. 4A. In the portion where the finger 501 does not exist over the touch panel 503, white is displayed on the display screen 500. In the portion where the finger 501 exists over the touch panel 503 and the finger 501 touches directly the touch panel 503, the reflected light 507a and the external light 506b are incident, forming a light shadow 701. In the portion where the finger 501 exists over the touch panel 503 and the finger 501 does not touch directly the touch panel 503, a shadow 702 which is darker than the shadow 701 is formed.

Next, the mechanism of detection of the location of a touch in the case where the display screen displays black (when all the self-light-emitting elements in the touch panel are in a non-light-emitting state) is described with reference to FIGS. 4C and 4D.

As shown in FIG. 4D, a finger touches the touch panel 503. At this time, the external light 506 emitted from the light source 502 is incident on the object (finger) 501 and the touch panel 503.

In the portion where the finger 501 does not exist over the touch panel 503, the external light 506 is incident on the photo sensor. Thus, the external light 506 can be detected by the photo sensor. In the portion where the finger 501 exists over the touch panel 503 and the finger 501 touches directly the touch panel 503, the external light 506 is considerably blocked. However, since the external light 506 is not completely blocked, a small amount of the external light 506b can be detected by the photo sensor 504b. In the portion where the finger 501 exists over the touch panel 503 and the finger 501 does not touch directly the touch panel 503, the external light 506 is slightly blocked. The external light 506a, the amount (intensity) of which is greater than the external light 506b, can be detected by the photo sensor 504a.

Since the self-light-emitting element 505 is in a non-light-emitting state, there is no light emitted from the self-light-emitting element 505. That is, light detected by the photo sensor 504a present at the touch location and light detected by the photo sensor 504b present at a non-touch location are only external light; the light detected by the photo sensor 504a and the light detected by the photo sensor 504b are the external light 506a and the external light 506b, respectively. The amount (intensity) of the external light 506 detected by the photo sensor 504 depends on the gray scale of the shadow of the finger 501.

A state of the display screen 500 of the touch panel 503 at this time is described with reference to FIG. 4C. In the portion where the finger 501 does not exist over the touch panel 503, black is displayed on the display screen 500. In the portion where the finger 501 exists over the touch panel 503 and the finger 501 touches directly the touch panel 503, the external light 506b is incident, forming a dark shadow 703. In the portion where the finger 501 exists over the touch panel 503 and the finger 501 does not touch directly the touch panel 503, the external light 506a is incident, forming a shadow 704 which is lighter than the shadow 703.

In one embodiment of the present invention, the proportion of the amount (intensity) of the light 507 emitted from the self-light-emitting element 505 to that of the external light 506 is not limited in particular. Note that the amount (intensity) of the light 507 emitted from the self-light-emitting element 505 is preferably larger (higher) than the amount (intensity) of the external light 506. In any case, the effect of the external light can be reduced by using imaging data at the time of the black display and imaging data at the time of the white display as long as there is no steep change between the amount (intensity) of the external light 506 when white is displayed and between that when black is displayed.

In the above-described manner, in accordance with one embodiment of the present invention, imaging data at the time of displaying white on the entire display screen and imaging data at the time of displaying black on the entire display screen are output from each sensor pixel in the image-capture period. As illustrated in FIGS. 4A to 4D, there is a difference between the imaging data at the time of displaying white on the entire screen and the imaging data at the time of displaying black on the entire screen which are output from each sensor pixel. At a location where the object does not exist over the display screen (a shadow is not formed), since only external light having the same amount is detected, a difference between these imaging data is very small. In contrast, at a location of a touch where the object touches the display screen, a difference between these imaging data output from the same sensor pixel is the greatest. The location of the sensor pixel where a difference between imaging data is the greatest is detected as the location of the touch of the object. Thus, the accuracy of detecting the location of a touch can be increased. By using imaging data at the time of the black display and imaging data at the time of the white display, the effect of external light can be reduced. Further, in addition to the external light, light emitted from the self-light-emitting element is used without providing another light source. Accordingly, increase in power consumption can be prevented.

Note that this embodiment can be freely combined with any of the other embodiments in this specification.

Embodiment 2

A pixel structure corresponding to FIGS. 2A and 2B and FIG. 3 described in Embodiment 1 is described in this embodiment with reference to FIG. 5, FIGS. 6A and 6B, and FIG. 7. Note that the portions which are the same as those in FIGS. 2A and 2B and FIG. 3 are described using the same reference numerals in the description for FIG. 5, FIGS. 6A and 6B, and FIG. 7.

Figure 5:
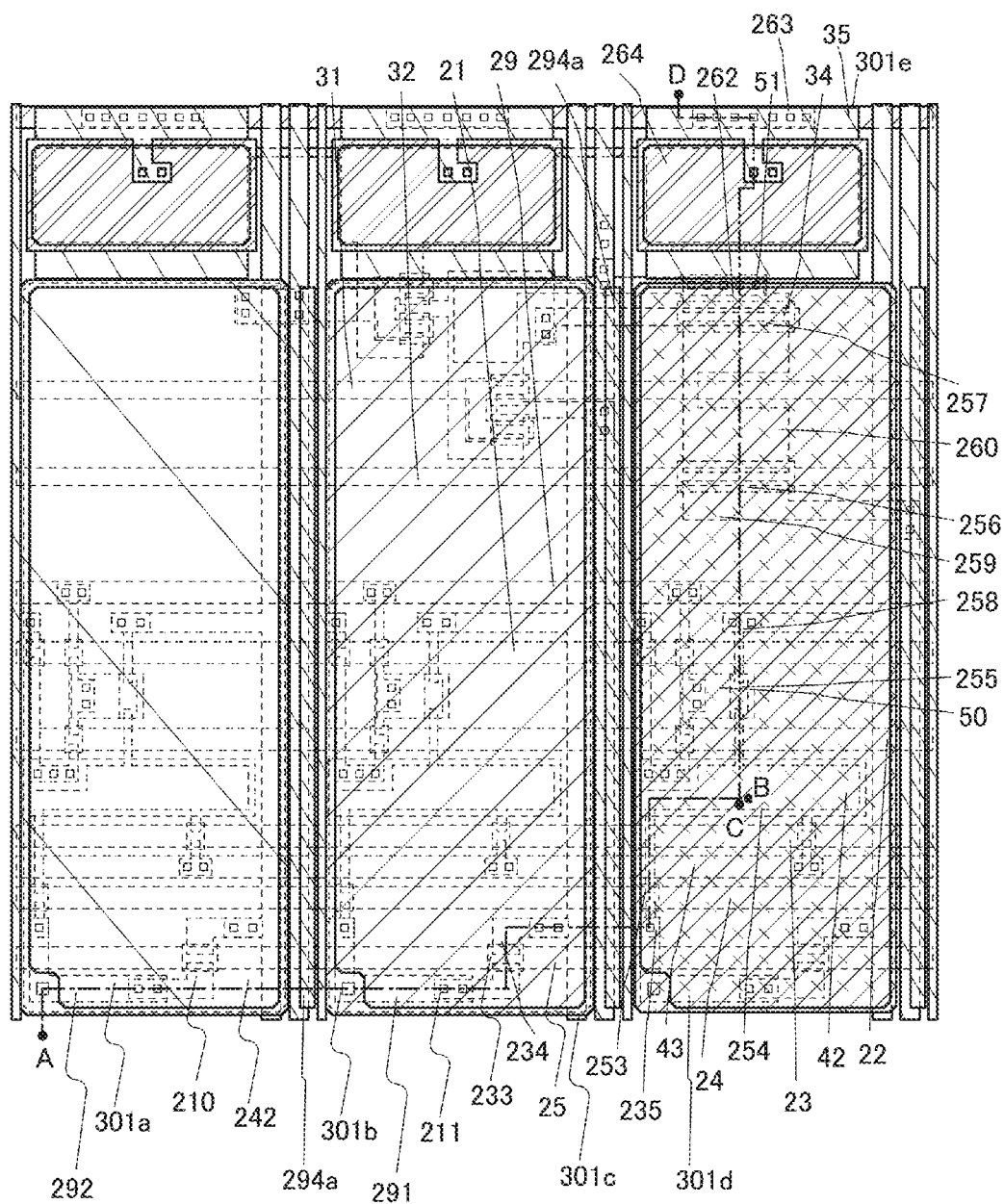
FIG. 5 shows an example of a plan view of a pixel, illustrating one embodiment of the present invention.
Figure 6:
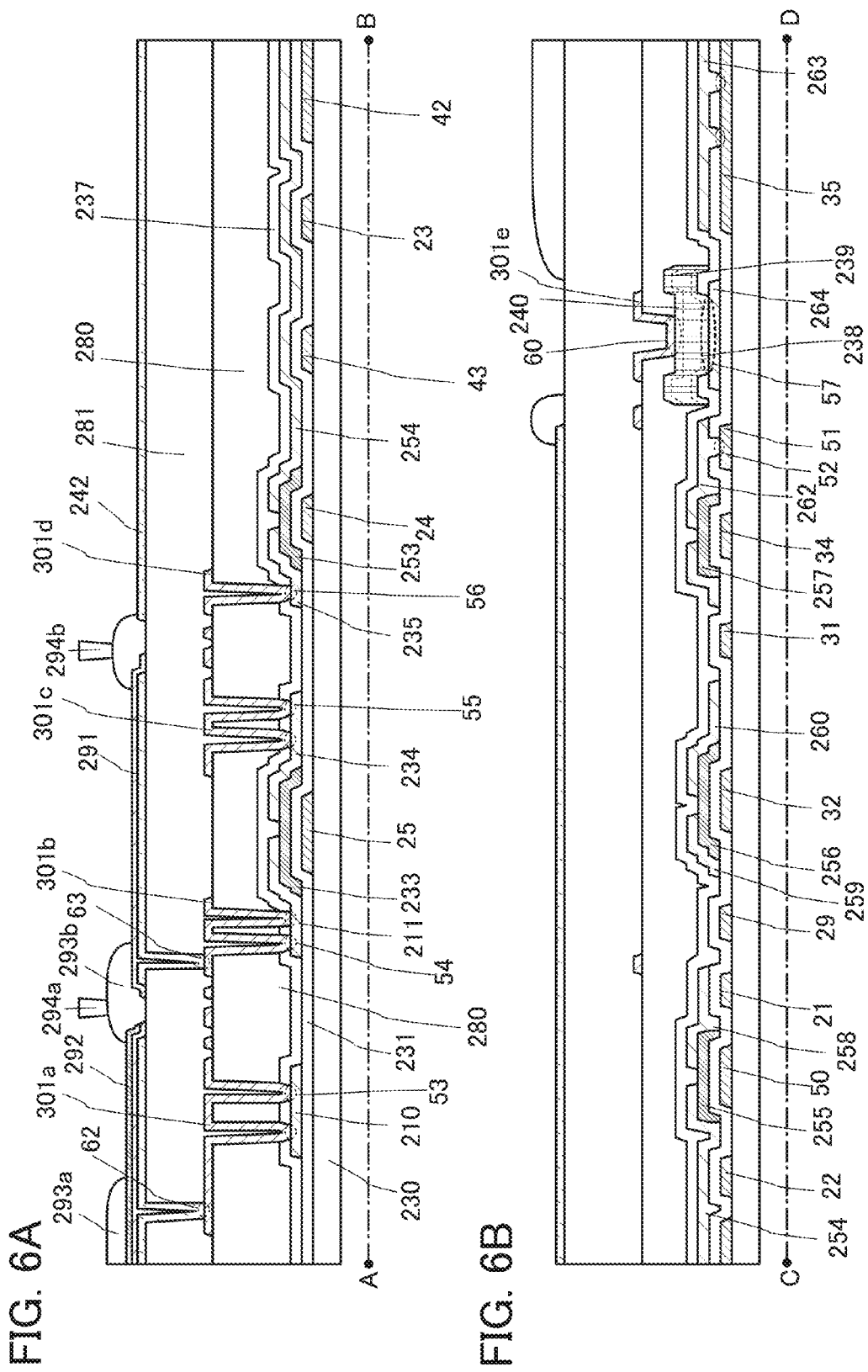
FIGS. 6A and 6B are cross-sectional views showing an example of a pixel, illustrating one embodiment of the present invention.
Figure 7:
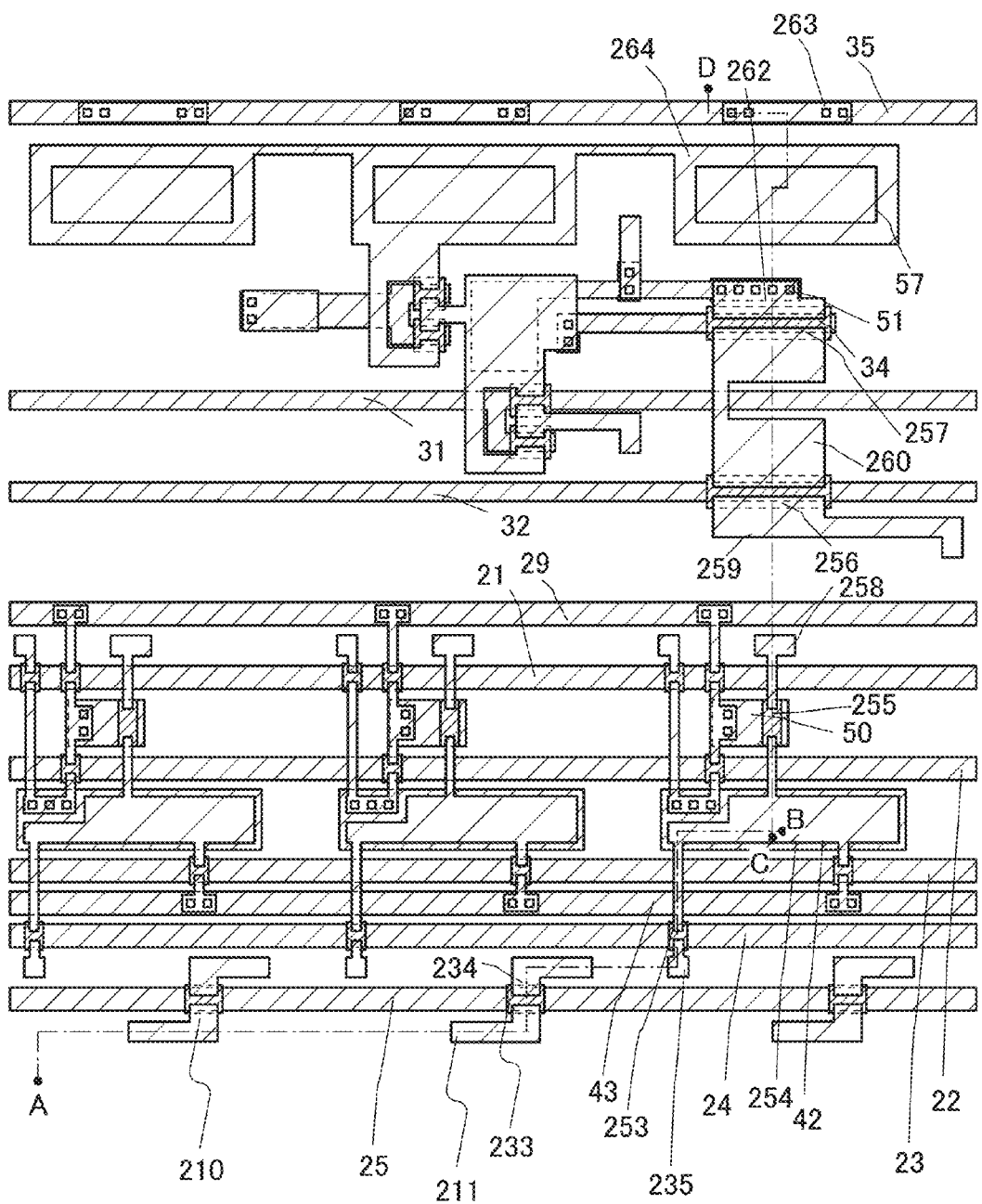
FIG. 7 shows an example of a plan view of a pixel, illustrating one embodiment of the present invention.

FIG. 5 and FIG. 7 illustrate examples of a plan view of a pixel, corresponding to the circuit diagram of FIGS. 2A and 2B. Note that a cross-sectional view taken along a chain line A-B and a cross-sectional view taken along a chain line C-D in FIG. 5 and FIG. 7 correspond to FIG. 6.

First, a conductive film is formed over a substrate 230. Then, a first photolithography step is performed using a first photomask, thereby forming a fifth display pixel control signal line 25, a fourth display pixel control signal line 24, a power supply line 43, a third display pixel control signal line 23, a node 42, a second display pixel control signal line 22, a gate signal line 50, a first display pixel control signal line 21, a power supply line 29, an image-capture pixel control signal line (SE) 32, an image-capture pixel control signal line (PR) 31, a node (FD) 34, a gate signal line 51, and an output signal line 35. In this embodiment, a glass substrate with a thickness of 0.7 mm is used as the substrate 230. Further, a tungsten film with a thickness of 200 nm is used as the conductive film.

An insulating film serving as a base film may be provided between the substrate 230 and the conductive film. The base film has a function of preventing diffusion of impurity elements from the substrate 230, and can be formed to have a single-layer structure or a stacked structure using one or more of a silicon nitride film, a silicon oxide film, a silicon nitride oxide film, and a silicon oxynitride film.

The conductive film can be formed with a single-layer structure or a stacked structure including a metal material such as molybdenum, titanium, tantalum, tungsten, aluminum, copper, neodymium, or scandium, or an alloy material which contains any of these metal materials as its main component.

Next, a gate insulating layer 231 covering these wirings is formed. A silicon oxynitride film or the like can be used for the gate insulating layer 231. In this embodiment, a stacked layer of a silicon nitride film with a thickness of 50 nm and a silicon oxynitride film with a thickness of 270 nm is used as the gate insulating layer 231.

Next, an oxide semiconductor film is formed over the gate insulating layer 231. Then, a second photolithography step is performed using a second photomask, thereby forming a first oxide semiconductor layer 233, a second oxide semiconductor layer 253, a third oxide semiconductor layer 255, a fourth oxide semiconductor layer 256, and a fifth oxide semiconductor layer 257. The first oxide semiconductor layer 233 overlaps with the fifth display pixel control signal line 25 with the gate insulating layer 231 provided therebetween. The second oxide semiconductor layer 253 overlaps with the fourth display pixel control signal line 24 with the gate insulating layer 231 provided therebetween. The third oxide semiconductor layer 255 overlaps with the gate signal line 50 with the gate insulating layer 231 provided therebetween. The fourth oxide semiconductor layer 256 overlaps with the image-capture pixel control signal line (SE) 32 with the gate insulating layer 231 provided therebetween. The fifth oxide semiconductor layer 257 overlaps with the node (FD) 34 with the gate insulating layer 231 provided therebetween.

An oxide semiconductor preferably contains at least indium (In) or zinc (Zn). As a stabilizer for reducing variations in electrical characteristics of a transistor including the oxide semiconductor, the oxide semiconductor preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

For example, indium oxide; gallium oxide; tin oxide; zinc oxide; a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a ternary metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Pr—Zn-based oxide, an In—Nd—Zn-based oxide, an In—S—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or a quaternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used as an oxide semiconductor.

Note that, for example, an In—Ga—Zn-based oxide means an oxide containing In, Ga, and Zn, and there is no limitation on the ratio of In, Ga, and Zn. In addition, the In—Ga—Zn-based oxide may contain a metal element other than In, Ga, and Zn. The In—Ga—Zn-based oxide has sufficiently high resistance when no electric field is applied thereto, so that off-state current can be sufficiently reduced. Further, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide whose composition is in the neighborhood of the above composition can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide whose composition is in the neighborhood of the above composition is preferably used.

For example, with an In—Sn—Zn-based oxide, high mobility can be comparatively easily obtained. However, even with an In—Ga—Zn-based oxide, mobility can be increased by lowering defect density in a bulk.

The structure of an oxide semiconductor film is described below.

An oxide semiconductor film is roughly classified into a single-crystal oxide semiconductor film and a non-single-crystal oxide semiconductor film. The non-single-crystal oxide semiconductor film means any of an amorphous oxide semiconductor film, a microcrystalline oxide semiconductor film, a polycrystalline oxide semiconductor film, a c-axis aligned crystalline oxide semiconductor (CAAC-OS) film, and the like.

The microcrystalline oxide semiconductor film includes a microcrystal (also referred to as nanocrystal) of greater than or equal to 1 nm and less than 10 nm, for example. Thus, the microcrystalline oxide semiconductor film has higher degree of atomic order than the amorphous oxide semiconductor film. Hence, the density of defect states of the microcrystalline oxide semiconductor film is lower than that of the amorphous oxide semiconductor film.

The amorphous oxide semiconductor film has disordered atomic arrangement and no crystalline component. A typical example the amorphous oxide semiconductor film is an oxide semiconductor film in which no crystal part exists even in a microscopic region, and the whole of the film is amorphous.

The CAAC-OS film is one of oxide semiconductor films including a plurality of crystal parts, and most of the crystal parts each fit into a cube whose one side is less than 100 nm. Thus, there is a case where a crystal part included in the CAAC-OS film fits into a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

In this specification, a term "perpendicular" indicates that an angle formed between two straight lines is 80 to 100°, and accordingly includes the case where the angle is 85 to 95°. In addition, a term "parallel" indicates that an angle formed between two straight lines is 10 to 10°, and accordingly includes the case where the angle is −5 to 5°.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (planar TEM image), metal atoms are arranged in a triangular or hexagonal configuration in the crystal parts. However, there is no regularity of arrangement of metal atoms between different crystal parts.

From the results of the cross-sectional TEM image and the planar TEM image, alignment is found in the crystal parts in the CAAC-OS film.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the InGaZnO$_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of InGaZnO$_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer which is arranged in a layered manner and observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where the shape of the CAAC-OS film is changed by etching or the like, the c-axis might not be necessarily parallel to a normal vector of a formation surface or a normal vector of a top surface of the CAAC-OS film.

Further, the crystallinity in the CAAC-OS film is not necessarily uniform. For example, in the case where crystal growth leading to the CAAC-OS film occurs from the vicinity of the top surface of the film, the crystallinity in the vicinity of the top surface is higher than that in the vicinity of the formation surface in some cases. Further, when an impurity is added to the CAAC-OS film, the crystallinity in a region to which the impurity is added is changed, and the crystallinity in the CAAC-OS film varies depending on regions.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

With the use of the CAAC-OS film in a transistor, change in electrical characteristics of the transistor due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

For example, a CAAC-OS film is deposited by sputtering with a polycrystalline metal oxide target. When ions collide with the target, a crystal region included in the target may be separated from the target along the a-b plane, and a sputtered particle having a plane parallel to the a-b plane (a flat-plate-like sputtered particle or a pellet-like sputtered particle) might be separated from the target. In that case, the flatplate-like sputtered particle reaches a substrate while maintaining its crystal state, so that the CAAC-OS film can be deposited.

For the deposition of the CAAC-OS film, the following conditions are preferably employed.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a treatment chamber may be reduced. Further, the concentration of impurities in a deposition gas may be reduced. Specifically, a deposition gas whose dew point is −80° C. or lower, preferably −100° C. or lower is used.

By increasing the substrate heating temperature during the deposition, migration of a sputtered particle occurs after the sputtered particle reaches the substrate. Specifically, the substrate heating temperature during the deposition is 100 to 740° C., preferably 200 to 500° C. By increasing the substrate heating temperature during the deposition, when the flat-plate-like sputtered particle reaches the substrate, migration occurs on the substrate, so that a flat plane of the sputtered particle is attached to the substrate.

Further, it is preferable to reduce plasma damage during the deposition by increasing the proportion of oxygen in the deposition gas and optimizing power. The proportion of oxygen in the deposition gas is 30 vol % or higher, preferably 100 vol %.

In this embodiment, an In—Ga—Zn-based oxide is used for the oxide semiconductor layer. A thin oxide film represented by a chemical formula of $InMO_3(ZnO)_m$ (m>0, where m is not an integer) can be used for the first oxide semiconductor layer 233, the second oxide semiconductor layer 253, the third oxide semiconductor layer 255, the fourth oxide semiconductor layer 256, and the fifth oxide semiconductor layer 257. Here, M represents one or more metal elements selected from Ga, Al, Mn, and Co. For example, M may be Ga, Ga and Al, Ga and Mn, Ga and Co, or the like. Further, $SiO_2$ may be contained in the above thin oxide film.

As the target for forming the oxide semiconductor layer by a sputtering method, for example, an oxide target having a composition ratio of $In_2O_3:Ga_2O_3:ZnO=1:1:1$ [molar ratio] is used to form an In—Ga—Zn—O film. Without limitation to the material and the component of the target, for example, an oxide target having a composition ratio of $In_2O_3:Ga_2O_3:ZnO=1:1:2$ [molar ratio] may be used.

Next, the oxide semiconductor layer is subjected to first heat treatment. With the first heat treatment, dehydration or dehydrogenation of the oxide semiconductor layer can be conducted. The temperature of the first heat treatment is higher than or equal to 300° C. and lower than or equal to 750° C., preferably higher than or equal to 400° C. and lower than the strain point of the substrate. The first heat treatment can be performed in an inert gas atmosphere, an oxygen atmosphere, or a dry air (air subjected to removal of moisture) atmosphere. In this embodiment, the substrate is introduced into an electric furnace that is one kind of a heat treatment apparatus, and heat treatment is performed in a nitrogen atmosphere at 450° C. for one hour for the oxide semiconductor layers. Note that the heat treatment may be performed in a nitrogen atmosphere and then performed in an oxygen atmosphere or a dry air atmosphere.

Next, the gate insulating layer 231 is selectively removed by a third photolithography step with the use of a third photomask, so that a first contact opening 52 reaching the gate signal line 51 is formed.

Next, a conductive film is formed over the gate insulating layer 231 and the oxide semiconductor layers. As the conductive film, for example, a metal film containing an element selected from Al, Cr, Cu, Ta, Ti, Mo, and W, an alloy film containing a nitride of any of these elements, an alloy film containing a combination of any of these elements, or the like can be employed. Then, a resist mask is formed over the conductive film by a fourth photolithography step using a fourth photomask and etching is selectively performed, thereby forming electrode layers 210, 211, 234, 235, 254, 258, 259, 260, 262, 263, and 264. In this embodiment, a stacked layer of a titanium film with a thickness of 50 nm, an aluminum film with a thickness of 400 nm, and a titanium film with a thickness of 100 nm is used as the conductive film.

Note that a transistor 104 illustrated in FIG. 2A includes the first oxide semiconductor layer 233 and the electrode layers 211 and 234 serving as a source electrode layer and a drain electrode layer. A transistor 103 illustrated in FIG. 2A includes the second oxide semiconductor layer 253 and the electrode layers 235 and 254 serving as a source electrode layer and a drain electrode layer. A transistor 107 illustrated in FIG. 2A includes the third oxide semiconductor layer 255 and the electrode layers 254 and 258 serving as a source electrode layer and a drain electrode layer. As illustrated in FIG. 5 and FIG. 7, the node 42, the gate insulating layer 231 as a dielectric, and the electrode layer 254 form a capacitor 111.

A transistor 124 illustrated in FIG. 2B includes the fourth oxide semiconductor layer 256 and the electrode layers 259 and 260 serving as a source electrode layer and a drain electrode layer. A transistor 123 illustrated in FIG. 2B includes the fifth oxide semiconductor layer 257 and the electrode layers 260 and 262 serving as a source electrode layer and a drain electrode layer.

Next, second heat treatment (preferably 200° C. to 400° C. inclusive, for example, from 250° C. to 350° C. inclusive) is performed in an inert gas atmosphere, an oxygen gas atmosphere, or a dry air atmosphere. In this embodiment, the second heat treatment is performed at 300° C. in a nitrogen atmosphere for one hour. In the second heat treatment, heating is performed while part (a channel formation region) of the oxide semiconductor layer is in contact with the insulating layer.

Next, an insulating layer 237 which is to be a protective insulating layer is formed, and a fifth photolithography step is performed with the use of a fifth photomask, whereby a photodiode opening 57 reaching the electrode layer 264 is formed. A plan view of a pixel up to this stage corresponds to FIG. 7.

Then, a p-layer 238, an i-type layer 239, and an n-type layer 240 are deposited using a plasma CVD method. In this embodiment, a 60 nm thick microcrystalline silicon film containing boron is used as the p-layer 238, a 400 nm thick amorphous silicon film is used as the i-type layer 239, and an 80 nm thick microcrystalline silicon film containing phosphorus is used as the n-type layer 240.

Next, a photosensitive organic resin layer 280 is formed. In this embodiment, an acrylic film with a thickness of 1500 nm is used as the photosensitive organic resin layer. Then, a sixth photolithography step is performed using a sixth photomask, thereby forming an opening 60 reaching the n-type layer 240, a second contact opening 53 reaching the electrode layer 210, a second contact opening 54 reaching the electrode layer 211, a second contact opening 55 reaching the electrode layer 234, and a second contact opening 56 reaching the electrode layer 235.

Next, a conductive film is formed over the photosensitive organic resin layer 280. As the conductive film, for example, a metal film containing an element selected from Al, Cr, Cu, Ta, Ti, Mo, and W, an alloy film containing a nitride of any of these elements, an alloy film containing a combination of any of these elements, or the like can be used. Then, a resist mask is formed over the conductive film by a seventh photolithography step using a seventh photomask and etching is selectively performed, thereby forming electrode layers 301a to 301e. In this embodiment, a stacked layer of a titanium film with a thickness of 100 nm, an aluminum film with a thickness of 400 nm, and a titanium film with a thickness of 100 nm is used as the conductive film.

The electrode layer 301a is electrically connected to the electrode layer 210 via the second contact opening 53. The electrode layer 301b is electrically connected to the electrode layer 211 via the second contact opening 54. The electrode layer 301c is electrically connected to the electrode layer 234 via the second contact opening 55. The electrode layer 301d is electrically connected to the electrode layer 235 via the second contact opening 56. The electrode layer 301e is electrically connected to a photodiode (the n-type layer 240) via the opening 60.

Next, a photosensitive organic resin layer 281 is formed over the electrode layer 301. In this embodiment, an acrylic film with a thickness of 1500 nm is used as the photosensitive organic resin layer. Then, an eighth photolithography step is performed using an eighth photomask, thereby forming a third contact opening 62 reaching the electrode layer 301a and a third contact opening 63 reaching the electrode layer 301b.

Next, a reflective conductive film is deposited and a ninth photolithography step using a ninth photomask is performed, whereby a reflective electrode layer 242 is formed. Al, Ag, or an alloy thereof such as aluminum containing Nd or an Ag—Pd—Cu alloy is used as the reflective conductive film. In this embodiment, a stacked layer of a titanium film with a thickness of 50 nm, an aluminum film with a thickness of 200 nm, and a titanium film with a thickness of 8 nm is used as the reflective conductive film.

Next, for a first microcavity (multiple reflection interference), an ITO layer containing silicon is deposited, and a tenth photolithography step is performed using a tenth photomask, whereby an ITO layer 291 containing silicon is formed. The ITO layer 291 containing silicon is formed over a display pixel for R (red) and a display pixel for G (green). In this embodiment, the ITO layer 291 containing silicon is deposited to a thickness of 40 nm.

Next, for a second microcavity, an ITO layer containing silicon is deposited, and an eleventh photolithography step is performed using an eleventh photomask, whereby an ITO layer 292 containing silicon is formed. The ITO layer 292 containing silicon is formed over the display pixel for R (red). In this embodiment, the ITO layer 292 is deposited to a thickness of 40 nm.

Next, partition walls 293a and 293b covering the reflective electrode layer 242, the ITO layer 291 containing silicon, and the ITO layer 292 containing silicon are formed. A resin or an inorganic insulating material is used as the partition walls. As the resin, for example, a polyimide resin, a polyamide resin, an acrylic resin, a siloxane resin, an epoxy resin, or a phenol resin can be used. In particular, either a negative photosensitive resin or a positive photosensitive resin is preferably used for easy formation of the partition walls. In this embodiment, the partition walls are each formed to a thickness of 1500 nm. A twelfth photolithography step is performed using a twelfth photomask, whereby an opening is further formed. Spacers 294a and 294b are formed over the partition walls 293a and 293b in which no opening is formed. Then, a self-light-emitting element layer is formed, and further, an optical film such as a color filter (RGB) is provided.

By the above-described process, a light-receiving element 121, a transistor 122, a transistor 123, a transistor 124, a transistor 125, a capacitor 126, a transistor 127, and a transistor 128 which form a sensor pixel 102, and a transistor 103, a transistor 104, a transistor 105, a transistor 106, a transistor 107, a transistor 108, a transistor 109, a self-light-emitting element 110, and a capacitor 111 which form a display pixel 101 can be manufactured over the same substrate by the twelve photolithography steps using the twelve photomasks in total.

This embodiment can be freely combined with any of the other embodiments in this specification.

Embodiment 3

In this embodiment, an example of a configuration of a sensor pixel reading circuit provided for the touch panel described in Embodiments 1 and 2 is described with reference to FIG. 8.

Figure 8:
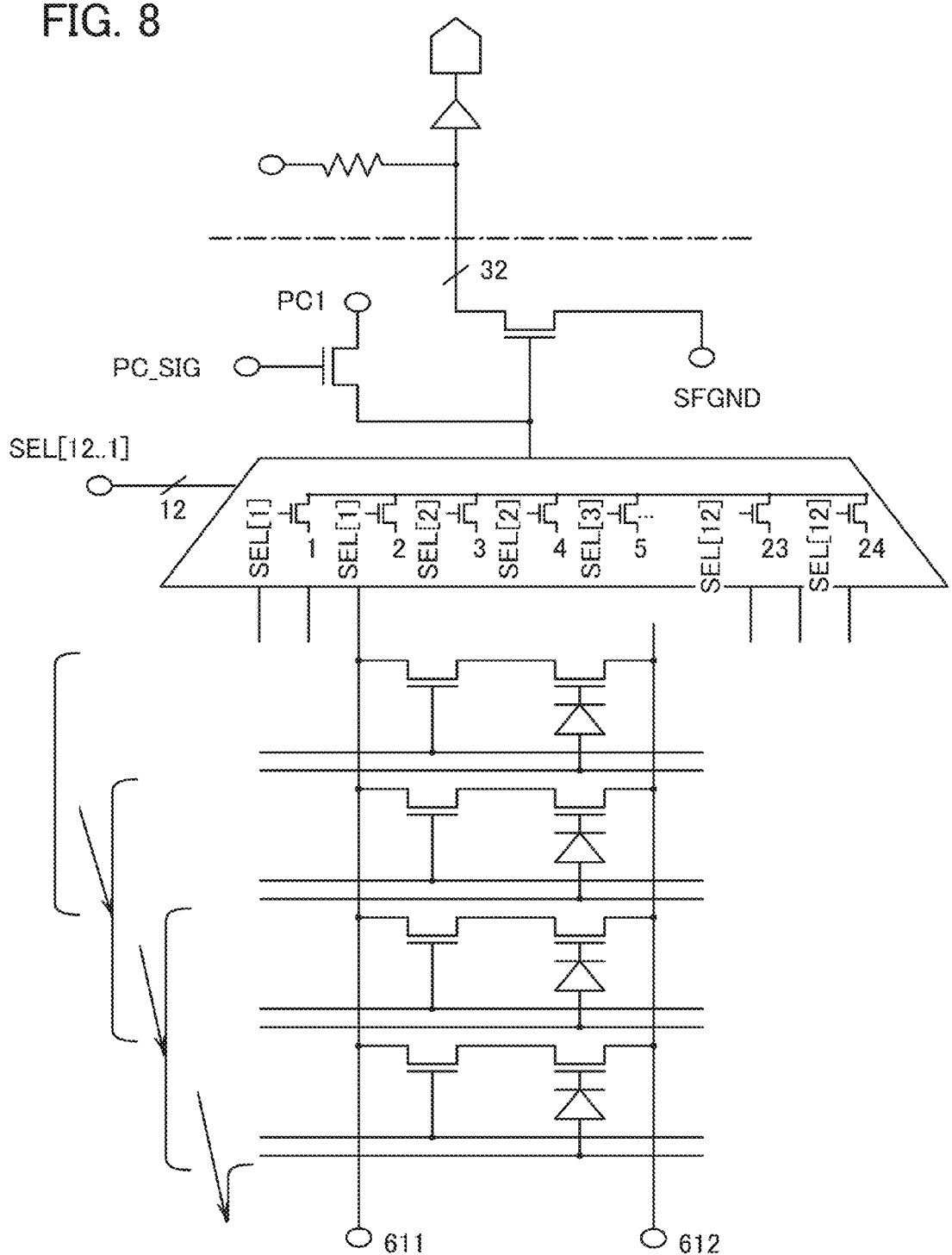
FIG. 8 shows an example of a schematic diagram of a driver circuit, illustrating one embodiment of the present invention.

As an example, the case where a driving method in which, as illustrated in FIG. 8, a scan line driver circuit for sensor pixels drives pixels for four rows (that is, sensor pixels for two rows) simultaneously and shifts selected rows by one row including sensor pixels corresponding to pixels for two rows will be given. Here, sensor pixels in each row are continually selected in a period in which the scan line driver circuit shifts selected rows twice. Such a driving method makes it easier to improve frame frequency at the time of imaging by a sensor pixel. In particular, it is advantageous in the case of a large-sized display device. Note that outputs of sensor pixels in two rows are superimposed in a sensor pixel output signal line 611 at one time. All of the sensor pixels can be driven by repeating shift of selected rows 512 times.

As illustrated in FIG. 8, the sensor pixel reading circuit includes one selector per 24 columns of pixels. The selector selects one pair from 12 pairs of sensor pixel output signal lines 611 (one pair corresponds to the sensor pixel output signal lines 611 of two columns) in the touch panel and obtains an output. That is, the sensor pixel reading circuit includes 32 selectors in total and thus obtains 32 outputs at one time. Selection is performed on all of the 12 pairs in each selector, whereby 384 outputs which correspond to one row of sensor pixels can be obtained in total. The selector selects 1 pair from the 12 pairs every time selected rows are shifted by the scan line driver circuit of sensor pixels, whereby outputs from all of the sensor pixels can be obtained.

In this embodiment, as illustrated in FIG. 8, the following structure may be employed: the sensor pixel reading circuit on the signal line side takes out outputs of sensor pixels, which are analog signals, to the outside of the display device, and the outputs are amplified with the use of an amplifier provided outside the display device and converted to digital signals with the use of an AD converter. Needless to say, the following structure may be employed: the AD converter is mounted on a substrate over which the display device is provided, and the outputs of sensor pixels are converted to digital signals and then the digital signals are taken out to the outside of the display device.

In addition, the operation of individual sensor pixels is realized by repeating a reset operation, an accumulating operation, and a selecting operation. The "reset operation" refers to an operation in which the potential of the image-capture pixel control signal line (PR) 31 is set to "H".

The "accumulating operation" refers to an operation in which the potential of the image-capture pixel control signal line (PR) 31 is set to a potential "L" after the reset operation. Further, the "selecting operation" refers to an operation in which the potential of the output signal line 35 is set to a potential "H" after the accumulating operation.

The potential of the node 34 changes depending on the amount (intensity) of light incident on a light-receiving element during the accumulating operation.

In this embodiment, when the reset operation, the accumulating operation, and the selecting operation are performed on all the sensor pixels, a partial shadow of external light can be detected. In addition, when image processing or the like is performed on the detected shadow appropriately, a position where a finger, a stylus pen, or the like touches the display device can be recognized. Operation corresponding to the position where the display device is touched, for example, as for input of letters, kinds of letters are regulated in advance, so that desired letters can be input.

With the above structure, a touch panel 1032 can have a touch-input function.

This embodiment can be freely combined with any of the other embodiments in this specification.

Embodiment 4

A semiconductor device disclosed in this specification can be applied to a variety of electronic devices (including game machines). Examples of electronic devices include a television set (also referred to as a television or a television receiver), a monitor of a computer or the like, cameras such as a digital camera and a digital video camera, a digital photo frame, a mobile phone, a portable game machine, a portable information terminal, an audio reproducing device, a game machine (e.g., a pachinko machine or a slot machine), a game console, and the like.

This application is based on Japanese Patent Application serial no. 2012-126387 filed with Japan Patent Office on Jun. 1, 2012, the entire contents of which are hereby incorporated by reference.

What is claimed is:

1. A semiconductor device comprising:
    a display pixel comprising:
        a first transistor;
        a second transistor;
        a light-emitting element;
        a first display pixel control signal line; and
        a second display pixel control signal line, and
    a sensor pixel comprising:
        a third transistor;
        a fourth transistor;
        a light-receiving element;
        a capacitor;
        a first image-capture pixel control signal line; and
        a second image-capture pixel control signal line,
    wherein a gate terminal of the first transistor and the first display pixel control signal line are electrically connected to each other,
    wherein a gate terminal of the second transistor and the second display pixel control signal line are electrically connected to each other,
    wherein a gate terminal of the third transistor and the first image-capture pixel control signal line are electrically connected to each other,
    wherein a gate terminal of the fourth transistor and the second image-capture pixel control signal line are electrically connected to each other,
    wherein one of a source terminal and a drain terminal of the first transistor and the light-emitting element are electrically connected to each other at a first node,
    wherein one of a source terminal and a drain terminal of the second transistor and the light-emitting element are electrically connected to each other at the first node,
    wherein one of a source terminal and a drain terminal of the third transistor and the light-receiving element are electrically connected to each other,
    wherein one of a source terminal and a drain terminal of the fourth transistor and another of the source terminal and the drain terminal of the third transistor are directly connected to each other,
    wherein a first electrode of the capacitor is directly connected to the one of the source terminal and the drain terminal of the fourth transistor, and
    wherein a second electrode of the capacitor is directly connected to another of the source terminal and the drain terminal of the fourth transistor.

2. The semiconductor device according to claim 1, wherein the first transistor, the second transistor, and the third transistor each comprise an oxide semiconductor layer.

3. The semiconductor device according to claim 2, wherein the oxide semiconductor layer includes indium, gallium, and zinc.

4. The semiconductor device according to claim 2, wherein the oxide semiconductor layer includes a c-axis aligned crystal.

5. The semiconductor device according to claim 1, wherein the third transistor overlaps with the light-emitting element.

6. The semiconductor device according to claim 1, wherein a plurality of display pixels is provided with respect to one sensor pixel.

7. The semiconductor device according to claim 1, wherein the semiconductor device is a touch panel.

8. The semiconductor device according to claim 1, wherein the semiconductor device is a portable information terminal.

9. A method for driving a semiconductor device, the semiconductor device comprising a touch panel comprising a plurality of display pixels and a plurality of sensor pixels, comprising:
    obtaining a first imaging data by using the sensor pixels in a first period where white is displayed on a display screen of the touch panel;
    obtaining a second imaging data by using the sensor pixels in a second period where black is displayed on the display screen of the touch panel; and
    detecting a sensor pixel where a difference between the first imaging data and the second imaging data is greatest,
    wherein the plurality of display pixels each comprise a first transistor and a second transistor,
    wherein the plurality of sensor pixels each comprise a third transistor, a fourth transistor, and a capacitor,
    wherein a gate terminal of the third transistor is electrically connected to a first image-capture pixel control signal line,
    wherein a gate terminal of the fourth transistor is electrically connected to a second image-capture pixel control signal line, wherein one of a source terminal and a drain terminal of the third transistor and one of a source terminal and a drain terminal of the fourth transistor are directly connected to each other, wherein a first electrode of the capacitor is directly connected to the one of the source terminal and the drain terminal of the fourth transistor, wherein a second electrode of the capacitor is directly connected to another of the source terminal and the drain terminal of the fourth transistor, and wherein, in the first period and the second period, a first high potential is applied to the first image-capture pixel control signal line, and a first low potential is applied to the second image-capture pixel control signal line.

10. The method for driving a semiconductor device according to claim 9, wherein a gate terminal of the first transistor is electrically connected to a first display pixel control signal line, wherein a gate terminal of the second transistor is electrically connected to a second display pixel control signal line, wherein, in the first period, a second low potential is applied to the first display pixel control signal line, and a second high potential is applied to the second display control signal line, and wherein, in the second period, the second low potential is applied to the first display pixel control signal line, and a third low potential is applied to the second display control signal line.

11. The method for driving a semiconductor device according to claim 9, further comprising:
displaying a still image or a moving image by input of a video signal potential to the plurality of display pixels between the first period and the second period.

12. The method for driving a semiconductor device according to claim 9, wherein the plurality of display pixels each comprise a light-emitting element.

13. The method for driving a semiconductor device according to claim 9, wherein the plurality of sensor pixels each comprise a light-receiving element.

14. The method for driving a semiconductor device according to claim 9, wherein the semiconductor device is a portable information terminal.

* * * * *